United States Patent
Hinds et al.

(10) Patent No.: US 11,277,598 B2
(45) Date of Patent: *Mar. 15, 2022

(54) SYSTEMS AND METHODS FOR NETWORK-BASED MEDIA PROCESSING

(71) Applicant: CABLE TELEVISION LABORATORIES, INC, Louisville, CO (US)

(72) Inventors: Arianne T. Hinds, Louisville, CO (US); David K. Broberg, Coupeville, WA (US); Darshak Thakore, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,575

(22) Filed: Sep. 17, 2018

(65) Prior Publication Data

US 2019/0028691 A1 Jan. 24, 2019

Related U.S. Application Data

(63) Continuation-in-part of application No. 15/997,522, filed on Jun. 4, 2018, which is a continuation of
(Continued)

(51) Int. Cl.
*H04N 13/139* (2018.01)
*H04N 13/161* (2018.01)
(Continued)

(52) U.S. Cl.
CPC ....... *H04N 13/139* (2018.05); *H04L 65/4084* (2013.01); *H04L 65/605* (2013.01);
(Continued)

(58) Field of Classification Search
CPC .... H04N 13/139; H04N 21/00; H04N 13/194; H04N 13/161; H04N 2213/007
See application file for complete search history.

(56) References Cited

U.S. PATENT DOCUMENTS 6,177,934 B1 * 1/2001 Sugiura .............. H04N 1/00236
715/748
6,430,599 B1 * 8/2002 Baker ....................... G06F 9/54
709/203

(Continued)

OTHER PUBLICATIONS

Jiri Katto et al., System Architecture for Synthetic/Natural Hybrid Coding and Some Experiments, IEEE Transactions On Circuits and Systems for Video Technology, vol. 9, No. 2, Mar. 1999 (Year: 1999).*

(Continued)

*Primary Examiner* — Philip P. Dang
(74) *Attorney, Agent, or Firm* — Armstrong Teasdale LLP

(57) ABSTRACT

In an embodiment, a network-based media processing system includes a media control plane implementing a first network protocol. The media control plane includes a media origin server. The system further includes a network control plane implementing a second network protocol. The network control plane includes a network platform orchestrator, a network orchestration client, a network resource element, and a plurality of media processing elements. A system further includes a media data plane implementing a third network protocol. The media data plane includes a plurality of media resources. The system further includes a media interchange format configured to provide a unified data format for delivering media according to a format requested from a client device. The first network protocol is different from the second network protocol.

17 Claims, 18 Drawing Sheets

Related U.S. Application Data application No. 13/922,345, filed on Jun. 20, 2013, now Pat. No. 9,992,475, which is a continuation of application No. 12/502,434, filed on Jul. 14, 2009, now Pat. No. 8,493,434.

(60) Provisional application No. 62/558,943, filed on Sep. 15, 2017, provisional application No. 62/575,415, filed on Oct. 21, 2017.

(51) Int. Cl.

| | | |
|---|---|---|
| *H04N 13/194* | (2018.01) | |
| *H04N 21/00* | (2011.01) | |
| *H04L 65/60* | (2022.01) | |
| *H04N 21/44* | (2011.01) | |
| *H04L 65/612* | (2022.01) | |
| *H04N 21/4363* | (2011.01) | |
| *H04N 21/45* | (2011.01) | |
| *H04N 21/81* | (2011.01) | |

(52) U.S. Cl.
CPC ......... *H04L 65/607* (2013.01); *H04N 13/161* (2018.05); *H04N 13/194* (2018.05); *H04N 21/00* (2013.01); *H04N 21/43635* (2013.01); *H04N 21/44012* (2013.01); *H04N 21/4516* (2013.01); *H04N 21/816* (2013.01); *H04N 2213/007* (2013.01)

(56) References Cited

U.S. PATENT DOCUMENTS

| | | | | |
|---|---|---|---|---|
| 6,594,699 B1* | 7/2003 | Sahai | ............... | H04L 29/06027 709/228 |
| 6,839,055 B1* | 1/2005 | Nguyen | ............... | G09G 3/006 345/204 |
| 6,993,570 B1* | 1/2006 | Irani | ............... | H04L 67/16 709/218 |
| 7,017,159 B1* | 3/2006 | Baker | ............... | H04L 12/2805 719/310 |
| 7,180,984 B1* | 2/2007 | Samarasinghe | ... | H04L 29/06027 370/354 |
| 7,243,291 B1* | 7/2007 | Williams | ............... | G09G 5/006 714/758 |
| 7,250,980 B2* | 7/2007 | Pasqualino | ............... | H04N 5/08 348/521 |
| 7,386,641 B2* | 6/2008 | Xu | ............... | H04L 12/2812 709/231 |
| 7,414,619 B2* | 8/2008 | Kim | ............... | G09G 5/003 345/204 |
| 7,415,486 B2* | 8/2008 | Multer | ............... | H04L 67/1095 |
| 7,463,926 B1* | 12/2008 | Levine | ............... | A61N 1/3706 600/509 |
| 7,475,140 B2* | 1/2009 | Requena | ............... | H04W 4/02 709/225 |
| 7,477,244 B2* | 1/2009 | Noorbakhsh | ............... | G09G 3/2096 345/204 |
| 7,562,161 B2* | 7/2009 | Maciesowicz | ............... | G06F 3/14 345/1.1 |
| 7,630,986 B1* | 12/2009 | Herz | ............... | G06Q 10/10 |
| 7,644,108 B1* | 1/2010 | Malmskog | ............... | G06F 16/9574 709/203 |
| 7,646,391 B1* | 1/2010 | Hayward | ............... | H04N 1/603 345/590 |
| 7,719,482 B2* | 5/2010 | Unger | ............... | G06F 3/1415 345/2.3 |
| 7,823,083 B2* | 10/2010 | Rohrabaugh | ............... | H04L 67/04 715/815 |
| 7,827,034 B1* | 11/2010 | Munns | ............... | G09B 5/00 704/275 |
| 7,839,409 B2* | 11/2010 | Noorbakhsh | ............... | G09G 5/006 345/531 |
| 7,911,473 B2* | 3/2011 | Noorbakhsh | ............... | G09G 5/363 345/531 |
| 7,911,475 B2* | 3/2011 | Noorbakhsh | ............... | G09G 5/006 345/544 |
| 7,924,861 B2* | 4/2011 | Baba | ............... | G09G 5/006 370/419 |
| 7,974,295 B2* | 7/2011 | Tuohino | ............... | H04L 67/14 370/401 |
| 7,983,228 B1* | 7/2011 | Choksi | ............... | H04L 65/4061 370/338 |
| 7,995,043 B2* | 8/2011 | Noorbakhsh | ............... | G06F 13/1605 345/204 |
| 8,019,905 B2* | 9/2011 | Wu | ............... | G09G 5/006 710/14 |
| 8,032,397 B2* | 10/2011 | Lawless | ............... | G16H 10/60 705/3 |
| 8,037,138 B2* | 10/2011 | Izumi | ............... | H04L 12/289 709/206 |
| 8,140,707 B2* | 3/2012 | Lee | ............... | H04L 61/2575 709/245 |
| 8,276,005 B2* | 9/2012 | Bae | ............... | H04N 11/042 713/300 |
| 8,316,393 B2* | 11/2012 | Roberts | ............... | H04N 21/42203 725/37 |
| 8,326,942 B2* | 12/2012 | Cagenius | ............... | H04N 21/643 709/217 |
| 8,327,026 B1* | 12/2012 | Tripathi | ............... | H04L 69/04 709/247 |
| 8,352,755 B2* | 1/2013 | Bae | ............... | H04N 5/63 713/300 |
| 8,374,172 B2* | 2/2013 | Jana | ............... | H04N 21/2393 370/352 |
| 8,479,236 B2* | 7/2013 | Tao | ............... | H04N 5/765 725/80 |
| 8,495,685 B2* | 7/2013 | Moon | ............... | H04N 21/4108 725/81 |
| 8,631,069 B2* | 1/2014 | Maes | ............... | H04L 65/1046 709/204 |
| 8,723,756 B2* | 5/2014 | Kim | ............... | G06F 3/1431 345/1.3 |
| 8,799,955 B2* | 8/2014 | Jones | ............... | H04N 21/4667 725/46 |
| 8,832,287 B2* | 9/2014 | Yang | ............... | H04L 65/4092 709/229 |
| 8,837,444 B2* | 9/2014 | Noldus | ............... | H04L 61/1588 370/338 |
| 9,112,876 B2* | 8/2015 | Noldus | ............... | H04L 65/104 |
| 9,142,036 B2* | 9/2015 | Lasserre | ............... | G06T 9/00 |
| 9,264,688 B2* | 2/2016 | Diggins | ............... | H04N 13/161 |
| 9,277,210 B2* | 3/2016 | Yang | ............... | H04N 21/43637 |
| 9,288,276 B2* | 3/2016 | Adamczyk | ............... | H04L 67/24 |
| 9,386,160 B2* | 7/2016 | Kruithof | ............... | H04L 65/104 |
| 9,538,160 B1* | 1/2017 | Cole | ............... | H04N 13/243 |
| 9,578,289 B2* | 2/2017 | Roberts | ............... | H04N 7/17318 |
| 9,723,290 B2* | 8/2017 | D'Amato | ............... | H04N 13/156 |
| 9,742,636 B2* | 8/2017 | Garg | ............... | H04L 61/6009 |
| 9,749,384 B2* | 8/2017 | Muramoto | ............... | H04N 21/4622 |
| 9,773,350 B1* | 9/2017 | Crosby | ............... | H04N 5/247 |
| 10,803,392 B1* | 10/2020 | Khan | ............... | H04L 67/10 |
| 10,805,187 B2* | 10/2020 | Luuppala | ............... | H04L 63/1425 |
| 2002/0036631 A1* | 3/2002 | Perez | ............... | G09G 5/006 345/204 |
| 2002/0057237 A1* | 5/2002 | Lin | ............... | G02F 1/133308 345/87 |
| 2002/0163598 A1* | 11/2002 | Pasqualino | ............... | H03L 7/0991 348/725 |
| 2005/0015797 A1* | 1/2005 | Noblecourt | ............... | H04N 21/4782 725/32 |
| 2005/0086398 A1* | 4/2005 | Chuang | ............... | G09G 5/006 710/16 |
| 2005/0232148 A1* | 10/2005 | Curcio | ............... | H04W 76/12 370/230 |
| 2006/0120362 A1* | 6/2006 | Westman | ............... | H04L 67/14 370/389 |
| 2007/0055731 A1* | 3/2007 | Thibeault | ............... | H04L 51/24 709/204 |

(56) References Cited

U.S. PATENT DOCUMENTS

| | | | | |
|---|---|---|---|---|
| 2007/0074241 | A1* | 3/2007 | Yeo | H04N 7/1675 725/31 |
| 2007/0100981 | A1* | 5/2007 | Adamczyk | H04L 69/18 709/223 |
| 2007/0118604 | A1* | 5/2007 | Costa Requena | H04L 67/24 709/206 |
| 2007/0186015 | A1* | 8/2007 | Taft | G09G 5/006 710/16 |
| 2007/0242062 | A1* | 10/2007 | Guo | G09G 5/008 345/204 |
| 2007/0291734 | A1* | 12/2007 | Bhatia | H04L 65/103 370/352 |
| 2007/0294437 | A1* | 12/2007 | Chen | G09G 5/006 710/8 |
| 2008/0126591 | A1* | 5/2008 | Kwon | H04N 5/775 710/15 |
| 2008/0155665 | A1* | 6/2008 | Ruppert | G07F 17/32 726/5 |
| 2008/0162637 | A1* | 7/2008 | Adamczyk | H04L 51/043 709/204 |
| 2008/0195761 | A1* | 8/2008 | Jabri | G09G 5/006 709/250 |
| 2008/0235380 | A1* | 9/2008 | Maes | H04L 65/1066 709/227 |
| 2008/0259060 | A1* | 10/2008 | Lin | H01R 31/005 345/204 |
| 2008/0273679 | A1* | 11/2008 | Russell | H04L 12/14 379/114.28 |
| 2009/0040923 | A1* | 2/2009 | Bantukul | H04L 41/06 370/230 |
| 2009/0041225 | A1* | 2/2009 | Agarwal | H04M 7/128 379/221.13 |
| 2009/0070408 | A1* | 3/2009 | White | H04N 21/25891 709/203 |
| 2009/0074156 | A1* | 3/2009 | Ku | H04L 63/306 379/35 |
| 2009/0077610 | A1* | 3/2009 | White | H04N 21/6582 725/131 |
| 2009/0106659 | A1* | 4/2009 | Rosser | G06F 16/4393 715/730 |
| 2009/0144641 | A1* | 6/2009 | Kim | G09G 5/003 715/763 |
| 2009/0172405 | A1* | 7/2009 | Shiomi | G11B 20/00695 713/176 |
| 2009/0219441 | A1* | 9/2009 | Kurita | H04N 21/4122 348/571 |
| 2011/0122230 | A1* | 5/2011 | Boisson | H04N 13/161 348/47 |
| 2012/0075420 | A1* | 3/2012 | Cho | H04N 13/178 348/43 |
| 2015/0117547 | A1* | 4/2015 | Zhao | H04N 21/4345 375/240.25 |
| 2016/0255322 | A1* | 9/2016 | Kerofsky | H04N 21/4318 348/51 |
| 2016/0255327 | A1* | 9/2016 | Cole | G09G 5/006 348/43 |
| 2016/0261841 | A1* | 9/2016 | Mathew | G02B 27/0093 |
| 2016/0269712 | A1* | 9/2016 | Ostrover | H04S 7/302 |
| 2016/0269716 | A1* | 9/2016 | Cole | H04N 13/282 |
| 2017/0010584 | A1* | 1/2017 | Kim | H04N 13/243 |
| 2017/0150139 | A1* | 5/2017 | Lee | G06F 3/011 |
| 2017/0280166 | A1* | 9/2017 | Walkingshaw | H04N 19/167 |

OTHER PUBLICATIONS

ISO/IEC JTC1/SC29/WG11 N17064; Requirements for MPEG-I hybrid natural/synthetic scene data container (V.1), Jul. 2017, Torino, IT (Year: 2017).*

ISO/IEC JTC 1/SC 29/WG 11 N16921, Ad hoc groups established at MPEG 119, Torino, IT—Jul. 2017 (Year: 2017).*

Adrian Pennington "Compression Enters the High-Performance Era" May 11, 2018 (Year: 2018).*

MPEG Column: 119th MPEG Meeting in Turin, Italy, ACM SIGMM Records vol. 9, Issue 2, Sep. 2017 (ISSN 1947-4598) (Year: 2017).*

Fabio Lavagetto, VIDAS 1 Workshop on Synthetic Natural Hybrid Coding (Year: 1997).*

OTOY releases OctaneRender™ 1.5 and introduces .ORBX (Year: 2014).*

OTOY unveils OctaneRender 3:Massive upgrade to the world's best GPU renderer defines the state of the art for VFX in films, games and beyond (Year: 2015).*

* cited by examiner

| DISPLAY IDENTIFIER | DISPLAY TYPE |
|---|---|
| VENDOR A & PRODUCT A | OVER-UNDER MODE |
| VENDOR A & PRODUCT B | CHECKERBOARD MODE |
| VENDOR A & PRODUCT C | CHECKERBOARD MODE |
| VENDOR A & PRODUCT D | OVER-UNDER MODE |
| VENDOR B & PRODUCT A | OVER-UNDER MODE |
| VENDOR B & PRODUCT B | SIDE-BY-SIDE MODE |
| VENDOR B & PRODUCT C | OTHER MODE |
| VENDOR B & PRODUCT D | OTHER MODE |
| *** | |
| VENDOR N & PRODUCT N | OVER-UNDER MODE |

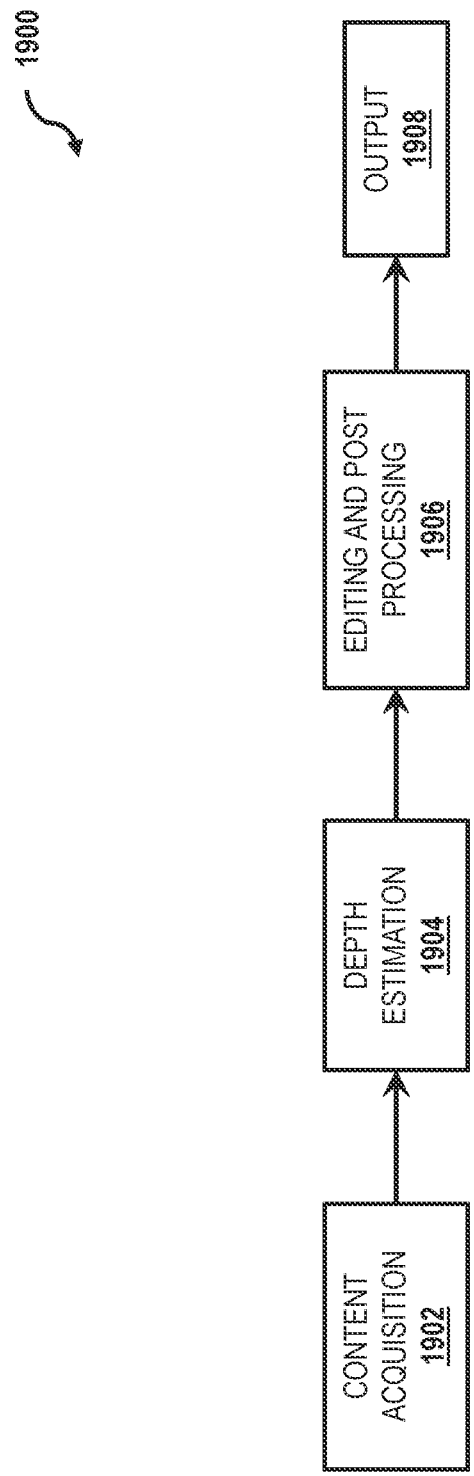

SYSTEMS AND METHODS FOR NETWORK-BASED MEDIA PROCESSING

CROSS-REFERENCE TO RELATED APPLICATIONS

This application is a continuation-in-part of U.S. application Ser. No. 15/997,522, filed Jun. 4, 2018, which first prior application is a continuation of U.S. application Ser. No. 13/922,345, filed Jun. 20, 2013, and issued Jun. 5, 2018 as U.S. Pat. No. 9,992,475, which second prior application is a continuation of U.S. application Ser. No. 12/502,434, filed Jul. 14, 2009, and issued Jul. 23, 2013 as U.S. Pat. No. 8,493,434. This application further claims the benefit of and priority to U.S. Provisional Patent Application Ser. No. 62/558,943, filed Sep. 15, 2017, and to U.S. Provisional Patent Application Ser. No. 62/575,415, filed Oct. 21, 2017. The disclosures of all of these prior applications are incorporated by reference herein in their entireties.

TECHNICAL FIELD

The present invention relates to formatting requirements of a display device, and more particularly to systems and methods for processing media over a network for display on a display device.

BACKGROUND

A High-Definition Multimedia Interface (HDMI) connection provides for uncompressed delivery of digital video content between a source device and a display device that conform to published specifications and standards. The existing standards (CEA-861E) and specifications (HDMI v1.3), however, provide for a wide range of video formats, e.g., standard definition (SD) and high definition (HD) at various picture sizes and frame rates. Because there are plethora of video transmission options that operate within the boundaries of the existing standards and specifications, the display devices are not necessarily restricted or otherwise configured to operate with a specific one of the options—there is no specific requirement for the carriage of video content between the source device and the display device. The video formatting requirements of the output devices, therefore, are decided by the manufacturers and tend to vary from one manufacturer to another.

For example, one manufacturer may use an over/under coding for 3D video where the separate left and right video images are packed into a single video frame with the left frame over the right frame, but squeezed into a single video frame. The video signals on the interface are fully compliant in every way with the existing standard except the source and display devices must somehow understand that for 3D content the first (upper) half of the video frame will be used for the "left-eye" image while the second (lower) half of the video frame will be used for the "right eye" image. As long as the exchange is understood and used in the same way by both of the source and display devices, compatibility is provided. Other manufacturers may use a similar scheme, but choose to place the left and right images side-by-side within a single frame. Still others alternate lines, pixels or frames between left and right source images. In addition to the spatial division and placement of the separate left and right signals, other techniques can be used, including inversion or mirroring of one signal versus the other.

Manufacturers deploying display devices are taking advantage of existing video formatting modes of the HDMI connection but with a private or a priori knowledge of the formatting requirements of the display device. In other words, the manufacturers are relying on the source device to have prior knowledge of the formatting requirements of the display device such that the source device can be deployed with the same design principles as the display device. As a result, even though a multitude of different and incompatible choices are possible, interoperability between the source device and display device is only possible between products designed according to the same formatting principals.

In environments where source devices are commonly deployed to subscribers or other locations where the formatting requirements of the display devices is unknown or not necessarily the same for each display device, there is a possibility of format incompatibility between the source device and the display device.

More recently, high-level content delivery to users or clients has been proposed through processing techniques performed over the network (referred to as Network-Based Media Processing (NBMP)). NBMP framework proposals seek to be implemented across a variety of networks, including cable, mobile, and satellite-based systems to support any type of client based on the individual client's processing capabilities. A rich NBMP framework seeks to facilitate the deployment of a diverse set of media services by any service provider, and for any device (e.g., ranging from thin-client head-mounted displays (HMDs), to computation-intensive light field displays).

NBMP has evolved from an original MPEG technique, referred to as Network Distributed Video Coding (NDVC), which was used for transcoding 2D video from the Cloud, and off-loaded to local networks and clients according to their own local processing requirements, to support a variety of mobile devices (e.g., including HMDs). The scope NDVC is being eclipsed by other emerging MPEG techniques for NBMP, aimed to support use cases consistent with Phase 1 of the MPEG-I (ISO/IEC 23090) suite of standards currently under development in MPEG. Note that Phase 1 of MPEG-I aims to support 360-degree video, graphics overlaid on top of video for primitive support of augmented reality (AR), and media processing for "interactivity" (e.g., autonomous vehicles and games) based on 2D video. In addition to supporting MPEG I Phase 1 use cases, it is desirable that NBMP be compatible with Network Function Virtualization (NFV) architectures and techniques.

Presently, a further desire has been expressed in the field for high-level NBMP design that supports volumetric media, including light field captured content, and in consideration of targets for MPEG-I Phase 2, which targets have yet to be realized. These targets include support of light field displays, AR displays, and six degrees of freedom (6 DoF) content (i.e. yaw, pitch, roll, and X/Y/Z translation of the viewer's head). Moreover, it is desirable in the field to develop, for these targets, a specification for the description of a media format (that can be used in the NBMP framework), and for light field displays in particular (e.g., for cable networks), using NBMP for the composition of the final media to be delivered to the client, and also using chaining network-based media functions. That is, it is desirable to design a Media Interchange Format (MIF) that can be used in NBMP and that can also be used for the composition, final editing, or binding of the final media to the display. It is also desirable for the media format to be agnostic to the exact features or requirements of a client display, thereby allowing the network that is supplying the media to leverage NBMP to chain network-based media functions to translate the display-agnostic media into the proper format required by a particular client. For example, one such translation could be to "flatten" 3D media into 2D media.

FIG. 5 is a schematic diagram of a legacy media processing network 500. Legacy media processing network 500 represents an end-to-end workflow architecture for legacy IP video, and generally includes four sections: (i) a content creation section 502; (ii) a contribution-into-network section 504; (iii) an IP network distribution section 506; and (iv) a client or display section 508. Content creation section 502 may include at least one of 2D content 510, which may include 2D live or on-demand video, and 360-degree video capture content 512, both of which may be sent to an origin server 514 of contribution-into-network section 504. 360-degree video capture content 512 may be sent through a stitching unit 516 prior to transmission to origin server 514. Origin server 514 may include intermediate storage capabilities.

IP network distribution section 506 includes one or more of a transcoder or packager 518, a cache 520, and a modem termination system 522 (e.g., a CMTS, OLT, etc.). Client section 508 is configured to receive content from MTS 522 at one or more of a set top box (STB) 524 and a modem 526 (e.g., a cable modem (CM), ONU, etc.). Received content at STB 524 (e.g., standard definition (SD) content) may then be sent to a first display 528, and content received at modems 526 (e.g., high definition (HD) or ultra-high definition (UHD) content) may be sent to one or more second displays 530 directly, or through a respective gateway 532 of modem 526 using a Wi-Fi network 534.

In operation of network 500, an end-to-end (e.g., content production/acquisition-to-display) workflow as established for 2D video and 360-degree video. Content is created or acquired by content creation section 502 and the content may include stereoscopic 2D (natural) video, 2D computer generated content, or 360-degree video created, for example, by stitching together (e.g., by stitching unit 516) individual frames of captured 2D content, where each individual frame may represent a sub-portion (i.e., a solid angle) of the 360-degree view of a scene. This content from content creation section 502 is then "contributed" (by contribution-into-network section 504) to IP network distribution section 506 for subsequent delivery to client section 508 of an end-user for eventual audio and/or visual display. Origin server 514 may move content received from content creation section 502 into intermediate storage for "ingest" into network distribution section 506, and transcoder/packager 518 is configured to transcode and/or package content into streamable chunks of data by the network distribution section 506. Each such streamable chunk may be created according to the current conditions of network section 506, and according to the features supported by displays 528, 530.

Network conditions may be supported by streaming low-quality (low bitrate), medium quality (medium-high bitrate), and high-quality (high bitrate) versions of the content, each of which may be created according to various features of the eventual display 528, 530. In some cases, displays 528, 530 may support only 2D or stereoscopic 2D content. In other cases, displays 528, 530 may support one or more of High Dynamic Range (HDR) and Electro-Optical Transfer Function (EOTF) curves, as well as Wide Color Gamut (WCG). In addition to the various HDR formats and optional support of WCG, displays 528, 530 may support various resolutions including SD, HD, or UHD. In general, displays 528, 530 will present (i.e., play back) the content in only one resolution (e.g., UHD), but can scale upwards (i.e., "upscale") any content that is provided by network distribution section 506 in a lower resolution. Legacy network 500, however, is limited to only 2D input formats, including stereoscopic 2D.

Some displays 528, 530 may support 360-degree video using equi-rectangular projection, cube-map projection, or other forms of projection of 360-degree video into a rectangle. Wi-Fi network 534 may, for example, include a Wi-Fi router (not separately shown). Whether from STB 524 or Wi-Fi network 534, the content is delivered to the respective display 528, 530, which may include a 360-degree video display, a UHD display, an HD display, or an SD display, with or without HDR or WCG support.

Immersive environments of VR and AR applications are often characterized in terms of the Virtual Reality Continuum (sometimes called the Milgram scale), which represents a continuous scale that describes the degree to which the particular application supports visual content ranging, at one extreme, from entirely real-world (i.e., all natural) content of a real environment to, at the other extreme, entirely synthetic (e.g., CGI) content in a purely virtual environment. For simplicity of explanation, VR applications may be regarded, without limitation, herein as those applications that support either all-natural (360-degree video, including 3 DoF, 3 DoF+, or other variations of 2D video) or all synthetic content (e.g., gaming applications), which are fully immersive visual environments, but do not, in this example, represent a mixture of both real and synthetic content in a mixed reality (MR) environment. In this example, MR applications range from an AR environment to an augmented virtuality (AV) environment, where the AR and AV environments represent varying degrees of mixture of natural and synthetic content. That is, the AR environment is typically considered to provide synthetic/virtual content overlaying a view or representation of the real-world. In other words, the virtual augments the real in AR, whereas in AV, the real augments the virtual.

Typical HMD devices support varying levels of applications of both mixed and non-mixed types of content. At present, VR services are expected to precede the availability of AR services because VR services are relatively easier technologies to deploy in conventional systems. One particular challenge to AR service deployment is establishing technologies that seamlessly support both real-world and synthetic types of content for the user in a single experience. Another challenge has been to facilitate authorship of such content in a way that flexibly to supports the creative process used to produce both types of content for display. Heretofore, it has been easier to legally protect purely real-world content or purely virtual content than it has been to protect mixed content.

One particular obstacle to legally protecting mixed content is due to the fact that the many entities operating in the emerging ecosystem do not presently have well-established standards with which to interoperate. Recent endeavors have attempted to create guidelines for end-to-end interoperable workflows. However, these recent endeavors have focused only on data formats that support the "all reality" end of the Milgram scale (e.g., real environment 702) to establish industry workflows for support of 360-degree video applications. Accordingly, there is a need to develop new standards for industry supported workflow for AR, AV, and VR applications. That is, there is a need to bootstrap a workflow that supports the entire Milgram scale, including a unifying data format (such as described by ORBX which is used as the basis for the MIF) that is capable of seamlessly supporting both natural and synthetic contents. Accordingly, an additional objective of the present application is to provide a unifying data format that facilitates the deployment of AR-based applications, and also supports of 6 DoF for both VR and AR services.

BRIEF SUMMARY

In an embodiment, a network-based media processing system includes a media control plane implementing a first network protocol. The media control plane includes a media origin server. The system further includes a network control plane implementing a second network protocol. The network control plane includes a network platform orchestrator, a network orchestration client, a network resource element, and a plurality of media processing elements. A system further includes a media data plane implementing a third network protocol. The media data plane includes a plurality of media resources. The system further includes a media interchange format configured to provide a unified data format for delivering media according to a format requested from a client device. The first network protocol is different from the second network protocol.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 19 depicts a workflow for six degrees of freedom content, in accordance with an embodiment.

Figures 1, 2:
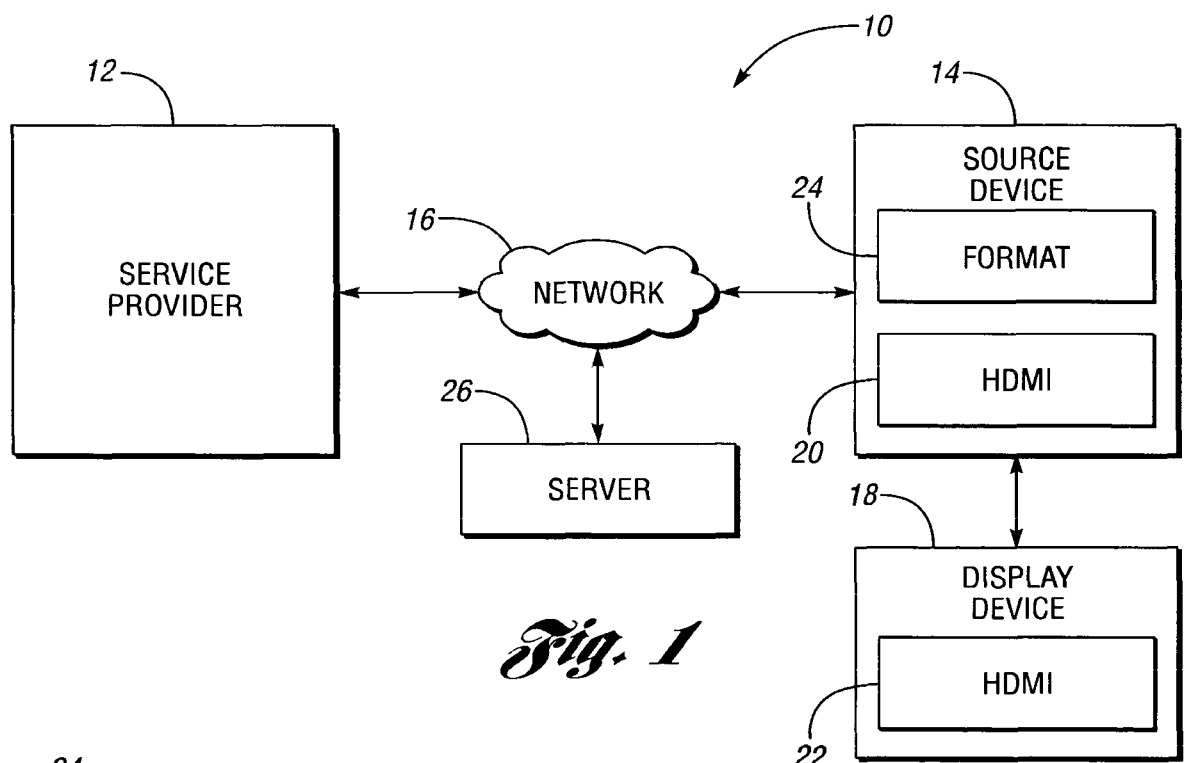
FIG. 1 illustrates an adaptive HDMI formatting system for 3D video transmission in accordance with one non-limiting aspect of the present invention.
FIG. 2 illustrates a formatting table in accordance with one non-limiting aspect of the present invention.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

FIG. 1 illustrates an adaptive HDMI formatting system 10 for 3D video transmission in accordance with one non-limiting aspect of the present invention. The system 10 may be configured to support the transmission of 3D video from a service provider 12 to a source device 14 located at a subscriber location. The source device 14 may be configured to format signals received from the service provider 12 over a network 16 to support output of 3D video to a display device 18 by way of HDMI ports 20, 22 used to support an HDMI connection between the source and display devices 14, 18. While the present invention is predominately described with respect to relying on an HDMI connection between the source device 14 and the display device 18 to facilitate formatting 3D video, the present invention is not intended to be so limited and fully contemplates formatting the signals for output as 2D video and according to other protocols.

3D video can be formatted according to a number of 3D formatting modes depending on a display type of the display device 18. For example, one display type may rely on an over-under formatting mode where separate left and right video images are packed into a single video frame with the left frame over the right frame within a single video frame. Another display type may rely on a side-by-side formatting mode where separate left and right video images are packed into a single video frame with the left frame being side-by-side with the right frame within a single video frame. Yet another display type may rely on a checkerboard formatting mode where left and right video images are dispersed throughout a single video frame. There are numerous display types that may rely on numerous formatting modes.

One non-limiting aspect of the present invention contemplates supporting virtually any display type with the source device 14 and without any a priori knowledge of the display type of the display device 18. In this manner, the present invention contemplates deployment of the source device 14 without the source device 14 having any knowledge of the display type or formatting requirements of the display device 18 before being connected to the display device 18. The present invention contemplates accomplishing this with a means for retrieving formatting requirements of the display device 18, such as but not limited to the use of a formatting table 24 included within the source device 14 or included on a server 26 or other device in remote communication with the source device. The formatting table 24 may be configured to associate display types with any number of display devices 18 based on an identifier associated with the display device 18 so that the formatting mode for any display type can be determined from the display identifier.

FIG. 2 illustrates the formatting table 24 in accordance with one non-limiting aspect of the present invention. The formatting table 24 may include a first column 28 of display identifiers that identify any of a possible number of display devices 18. A second column 30 may be included to list display types for each of the display identifiers 28 and their corresponding display requirements, i.e., over-under, checkerboard, side-by-side, etc. In the event new display devices are deployed, additional entries can be added to the table 24 to detail the display types and associated formatting modes. The display types are shown with respect to various 3D formatting modes for exemplary purposes and without intending to limit the scope and contemplation of the present invention. Any other type of formatting requirement and other operation requirements not otherwise known from information passed by display device 18 may be included within the table 24, including information related to 2D formatting modes for display devices that are not 3D ready.

To facilitate identifying the display identifier 28 of the display device 18 to be cross-referenced with the formatting table 24, one non-limiting aspect of the present invention contemplates the use of the HDMI connection to exchange information between the source device 14 and the display device 18 in a manner that facilitates assessment of the formatting requirements of the display device 18. Specifically, existing HDMI protocol requires an exchange of Extend Display Identification Data (EDID) information upon establishment of the HDMI connection between the source 14 and display 18 devices. The EDID is a standard published by the Video Electronics Standards Association (VESA) used by the display device 18 to advertise its capabilities to the source device 14 according to a commonly understood data format.

The EDID information may be embedded within a memory (not shown) of the display device 18 at the time of manufacture to identify a manufacturer name, product description or type, phosphor or filter type, timings supported by the display, display size, luminance data, 2D formatting requirements, and pixel mapping data (720, 720p, 1080, 1080p, etc.). The EDID information, however, does not identify the formatting requirements of the display device 18 with respect to 3D video and other information that may be specified within the formatting table 24. The present invention addresses this issue by cross-referencing one or more pieces of EDID information with the 3D video formatting requirements of the display type 30. This may include the source device 14 relying on the EDID information passed from the display device 18 to uncover the corresponding display identifier within the table 24, and from there, the 3D formatting mode required for that display type.

As illustrated in FIG. 2, the formatting table 24 may rely on the vendor name and product description fields defined by the EDID protocol to generate a display identifier 28 for each display device 18. In particular, an InfoFrame type 0x03 as defined by the EDID standard, which includes vendor name and product description fields, may be used as the display identifier 28 within the formatting table 24. This non-specific nomenclature for uniquely identifying the display type 30 from information already included within the EDID messages can be advantageous in that it does not require a unique identifier to be stored on the display device 18 and it allows the table to be easily updated to include new display types as newer display and formats become available. Reliance on a serial number or another type of individually specific reference designation to be embedded within the display device 18 may be more difficult to support since it would require a much larger table to list each of the unique numbers and some type of feedback system to continuously associate each new serial number with a 3D format within the table 24. Other display identifiers, however, can be used without deviating from the scope and contemplation of the present invention, including storing unique display identifiers within the display device 18.

Figure 3:
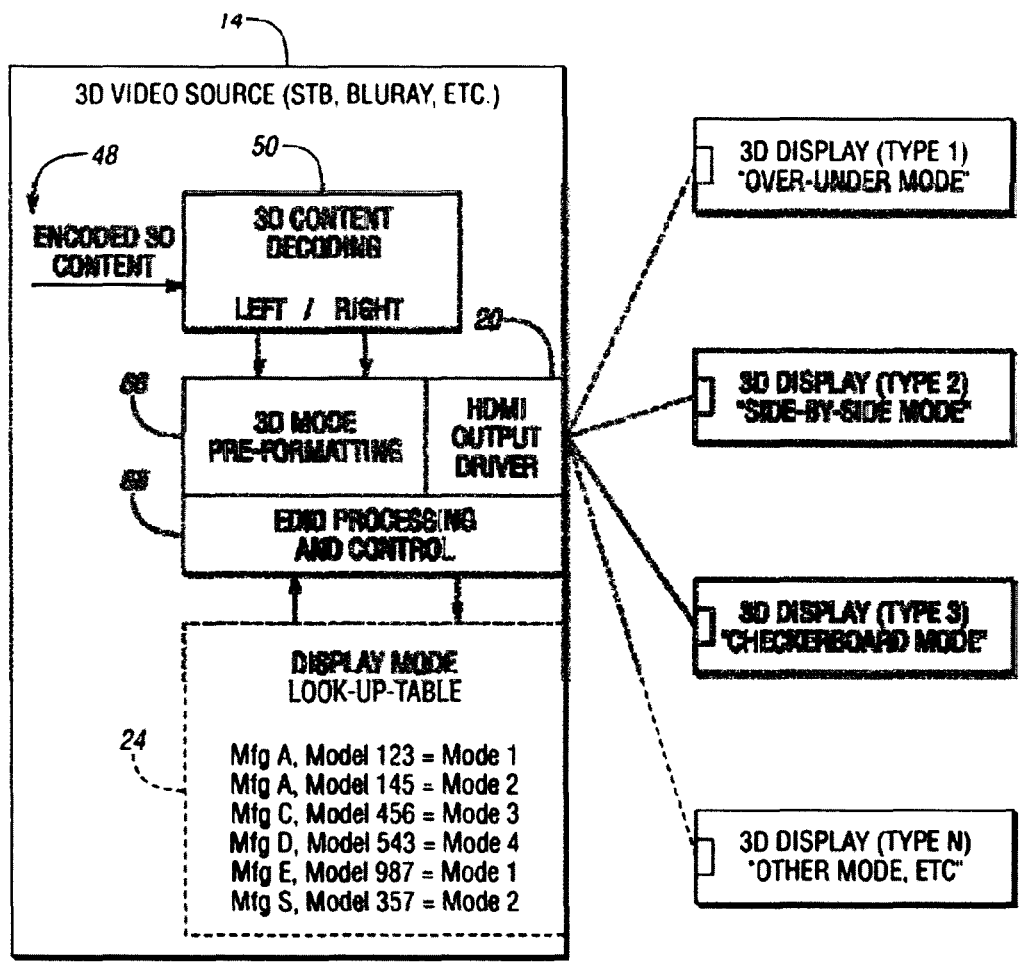
FIG. 3 illustrates a source device in accordance with one non-limiting aspect of the present invention.

FIG. 3 illustrates a configuration for the source device 14 contemplated by one non-limiting aspect of the present invention to facilitate adaptive 3D video formatting from EDID information transmitted from the display device 18 in accordance with HDMI transmission protocols. The source device 14 may be any device configured to receive a content stream 48 from the service provider 12 or other content source, such as but not limited to a satellite source, ATSC source, cable television source, IPTV source, video game console, STB, BluRay player etc., for formatting prior to output to the display device 18.

The output device 14 may include a 3D content decoding element 50 to recover left and right eye video frames used to support 3D viewing. Since 3D video typically requires the display of left and right eye video frames at a frequency sufficient for the mind to formulate a three-dimensional representation, the left and right eye images may be output to the display device 18 as two separate signal streams, although one signal stream having combined image frames could be used. The display device 18 may include two tuners or other processors to process the left and right signal streams for output according to the particular 3D formatting mode (3D display type) employed by the display device 18.

Figure 4:
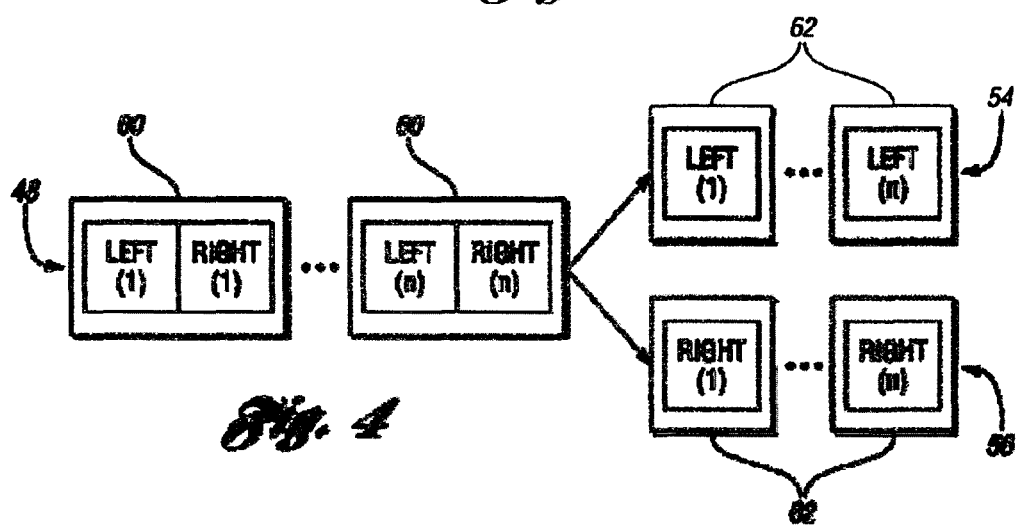
FIG. 4 illustrates a signal stream having left and right images combined into single frames and separation of the combined frames into single frames of left and right images.

To limit transmission costs, the left and right eye video frames may be transmitted to the source device 14 within a single video frame. As illustrated in FIG. 4, a single signal stream 48 may be provided to the source 14 and output as separate signal streams 54, 56 formatted according to the 3D requirements of the display device 18. The signal stream 48 may include a succession of combined image frames 60 in that each frame 60 has separate left and right images. The signal streams 54, 56 output to the display device 18 may include frames 62 comprised of single left and right images. The 3D content decoder 50 may be configured to recover the left and right images for use by a 3D pre-formatting element 66 in outputting the signal streams 54, 56 to be displayed by the display device 18.

The 3D mode pre-formatting element 66 may be configured to process the left and right eye video frames output from the 3D content decoding element 50 prior to output to the display device 18. The 3D mode pre-formatting element 66 may be configured to format the 3D video according to one of the 3D formatting modes noted above, i.e., the over-under formatting mode, the side-by-side formatting mode, the checkerboard formatting mode, or other formatting mode. The 3D mode pre-formatting element 66 may determine the appropriate 3D formatting mode based on the EDID information transmitted from the display device 18 upon establishment of the HDMI connection.

An EDID processing and controller element 68 may be included as part of the pre-formatting element 66 to facilitate the related processing and look-up within the formatting table 24. The 3D Mode pre-formatting element 66 may act upon the command signals from the EDID processing and control element 68 in order to rescale, invert, squeeze, filter or otherwise prepare the separate left and right pixels output from the 3D content decoding element 50 into the format needed by the display device. The HDMI output driver 20 may then be used to output the 3D video to the display device 18 according to the optimal 3D video format of the display device 18. In the event the display device 18 is not 3D ready, the pre-formatting element 66 may rely on 2D requirements specified by the EDID information to support output of 2D signals.

As supported above, one non-limiting aspect of the present invention relates to a system that dynamically modifies and reformats HDMI video output to support a plethora of 3D video formats by making use of a look-up-table of stored EDID information. This system can be used to provide the best-fit 3D video format for a wide range of 3D display types and configurations in an automated solution that universally adapts the output of the source device as needed to match the display device requirements. Alternately this information can be used with a simpler system to identify only those monitors that can accept a more limited range of or single type of 3D output format, while automatically reformatting the 3D content into 2D for non-compatible monitors.

Currently there are private 3D video formats being used over the HDMI interface to work with manufacturer specific 3D display technology. For example, some use over-under formatting, some use side-by-side formatting, and others use checkerboard formatting to convey the separate left and right eye images necessary for 3D video. These private formats are not defined by current HDMI specifications. Current CEA standards (CEA-861) do not support signaling to identify these various proprietary formats. To solve the problem the source device needs a priori knowledge of the best mode for each possible 3D display. This can be accomplished by creating a database of tested monitors, indexing that database with the manufacturer unique brand/model number that is already carried in the EDID information and using a look up table to retrieve the best-format type when the device initializes. This system solves the interoperability problem without the need to change any interface standards.

The source device 14 is generally described as being connected to the display device 18, however, this is done for exemplary purposes only. The present invention fully contemplates the source device 14 being part of the display device 18 or otherwise integrated with it and/or the source device 18 being part of a headend unit or other device of the service provider 12.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Network-Based Media Processing (NBMP)

Figure 5:
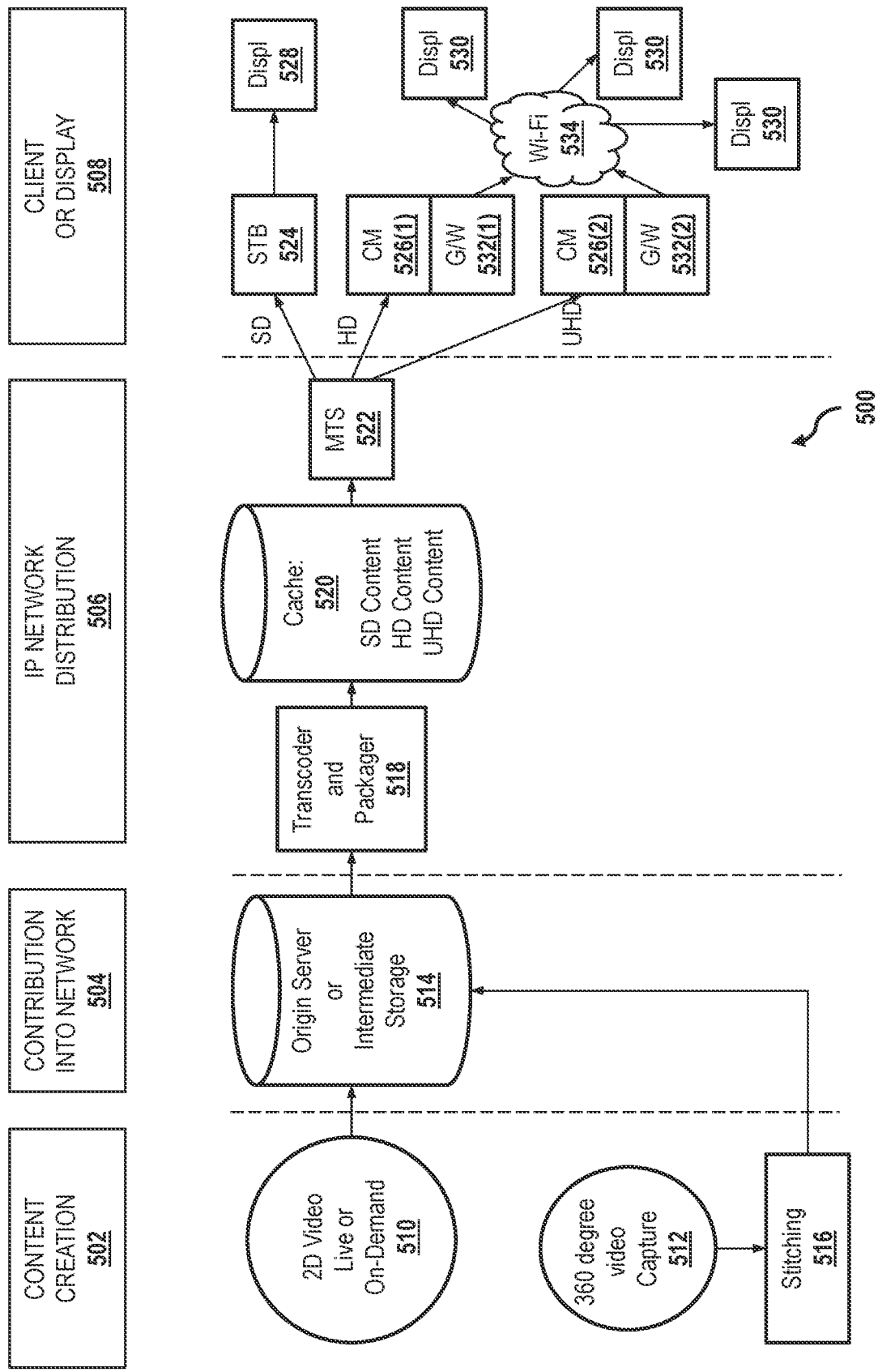
FIG. 5 is a schematic diagram of a legacy media processing network.

As described above, there is a need for service providers to be able to support emerging applications and displays for immersive experiences, including the corresponding media (which may or may not include 2D content) for the display thereof. However, the existing legacy network architecture (e.g., legacy media processing network 500, FIG. 5) has not been sufficiently robust to support the requirements of such new immersive experiences, particularly with respect to issues regarding latency, computational complexity, storage, and interactive application requirements. Moreover, such legacy networks conventionally only support 2D media content, which is insufficient to support AR, VR, MR, and holographic (including volumetric) applications for immersive experiences.

At present, several types of displays exist that support immersive experiences. For example, next generation HMDs are emerging that support foveated rendering for 360-degree video, including supporting tiles (e.g., rectangular, sub-portions of video frames) provided at various resolutions. In these devices, an exact center of the frame (e.g., where the eyes are focused) for 360-degree video is isolated into a single tile that is provided at a higher resolution than the immediate areas surrounding that exact center portion. The area immediately surrounding the exact center tile is then provided at a slightly lower resolution than the center portion, and remainder of the frame is provided at an even lower resolution. Other types of displays include AR displays (e.g., ODG glasses), MR displays (e.g., Magic Leap One), volumetric displays (e.g., LookingGlass), course resolution light-field displays (e.g., Fovi3D), and high-resolution light-field displays (e.g., Light Field Lab).

Figure 6:
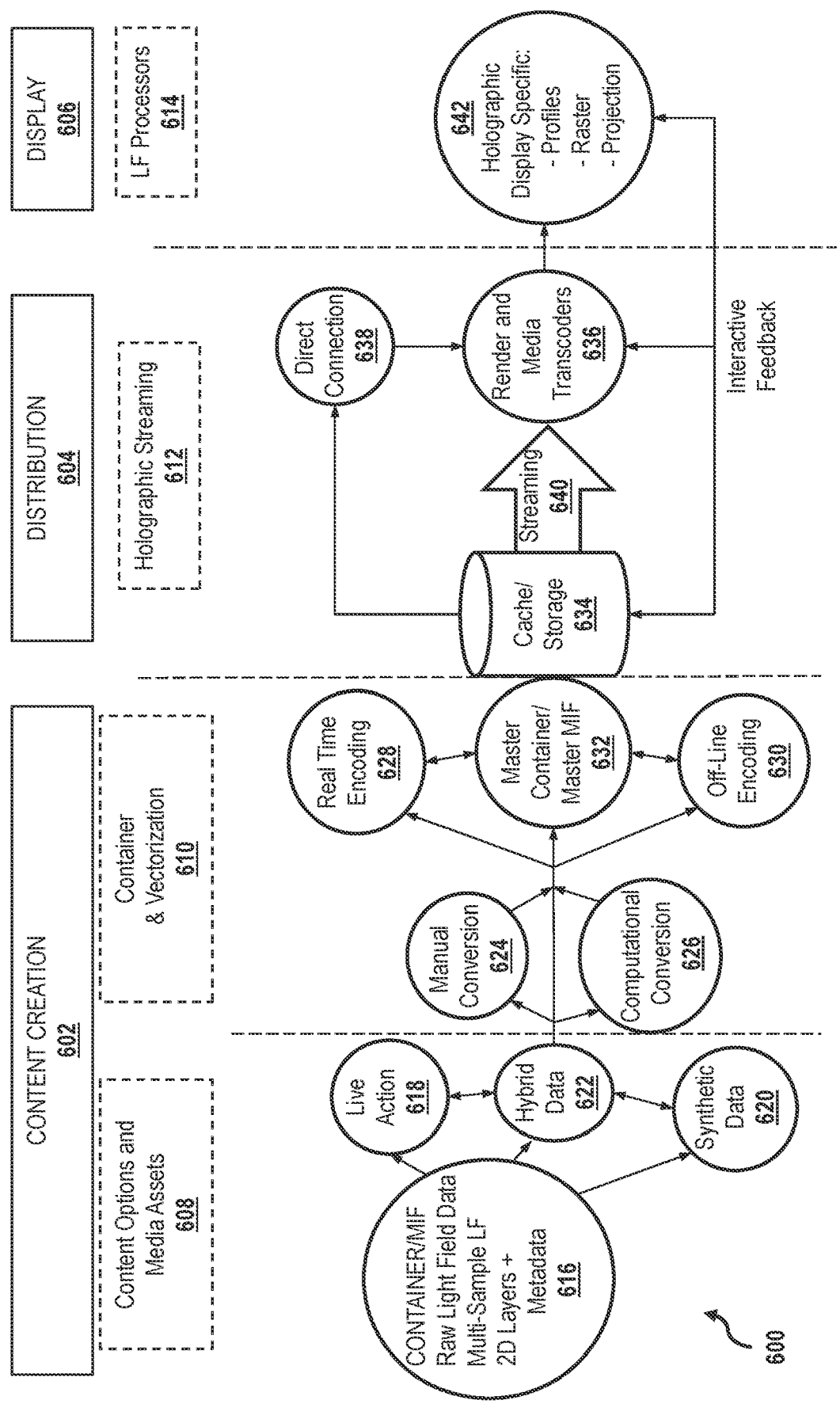
FIG. 6 is a schematic diagram of a processing network for light field content, in accordance with an embodiment.

FIG. 6 is a schematic diagram of a processing network 600 for light field content. In an exemplary embodiment, processing network 600 is configured to create, process, and distribute light field content for eventual display, and across the entire Milgram scale. In this example, network 600 includes three general sections: (i) a content creation section 602; (ii) a distribution section 604; and (iii) a display section 606. Content creation section 602 may, for example, include a content options and media assets subsection 608, and a container and vectorization subsection 610. Distribution section 604 may, for example, include a holographic streaming unit 612, and display section 606 may include one or more light field processors 614. Network 600 thus provides an exemplary workflow in support of light field displays (e.g., see FIG. 19, below).

In the embodiment illustrated in FIG. 6, An exemplary workflow demonstrates how to represent natural data (e.g., captured from a camera) into a format that can be used with CGI editors. This type of CGI format is sometimes referred to as a "synthetic representation," because it was originally purposed to store CGI data, but can be re-purposed to represent real-world, i.e. natural data captured from a camera, as well. This flow is explained further below with respect to FIGS. 10-11 and 19. As described further below, the NBMP systems and methods herein further leverages this synthetic representation of real-world data. This leveraging is further enhanced through the creation of a "display-agnostic" MIF capable of servicing both legacy displays and emerging new display types.

Options and assets subsection 608 includes a content container/MIF 616, which may be a container using a 3D interchange file format such as ORBX, or the NBMP MIF described herein, and include raw light field data, multi-sample light field data, 2D layers of visual data, and metadata. Content of container 616 may be filtered into live action data 618, synthetic data 620, and/or hybrid data 622, which may include one or both of live action data 618 and synthetic data 620, as well as other data from container 616 that may be further subjected to one or more of a manual conversion unit 624, a computational conversion unit 626, a real-time encoding unit 628, and an off-line encoding unit 630 before reaching a master container or master MIF 632. That is although the present MIF is configured to implement concepts from the ORBX paradigm, ORBX is entirely agnostic of how the content is distributed. The present MIF, on the other hand, thus functions as a "universal translator" of different media paradigms, thereby enabling full NBMP support irrespective of the media paradigm being input to the NBMP system, or output at the eventual display.

From master container 632, the converted and/or encoded hybrid data is stored within a cache 634 of distribution section 604 before delivery to one or more rendering and media transcoders 636, which may be by a direct connection 638 or from a streaming operation 640. The rendered/transcoded data is then sent to display section 606, which may include a holographic display 642 configured to display specific profiles, rasters, and projections related to light field content received thereby. In some cases, cache 634, transcoders 636, and display 642 are configured to operably communicate with one another to provide interactive feedback, particularly with respect to the display of light field content, virtual reality (VR) content, and AR content.

The MIF of the present application thus provides a unifying data format that facilitates the deployment of AR-based applications, while also supporting 6 DoF for both VR and AR services, and additionally, legacy 2D applications.

Figure 7:
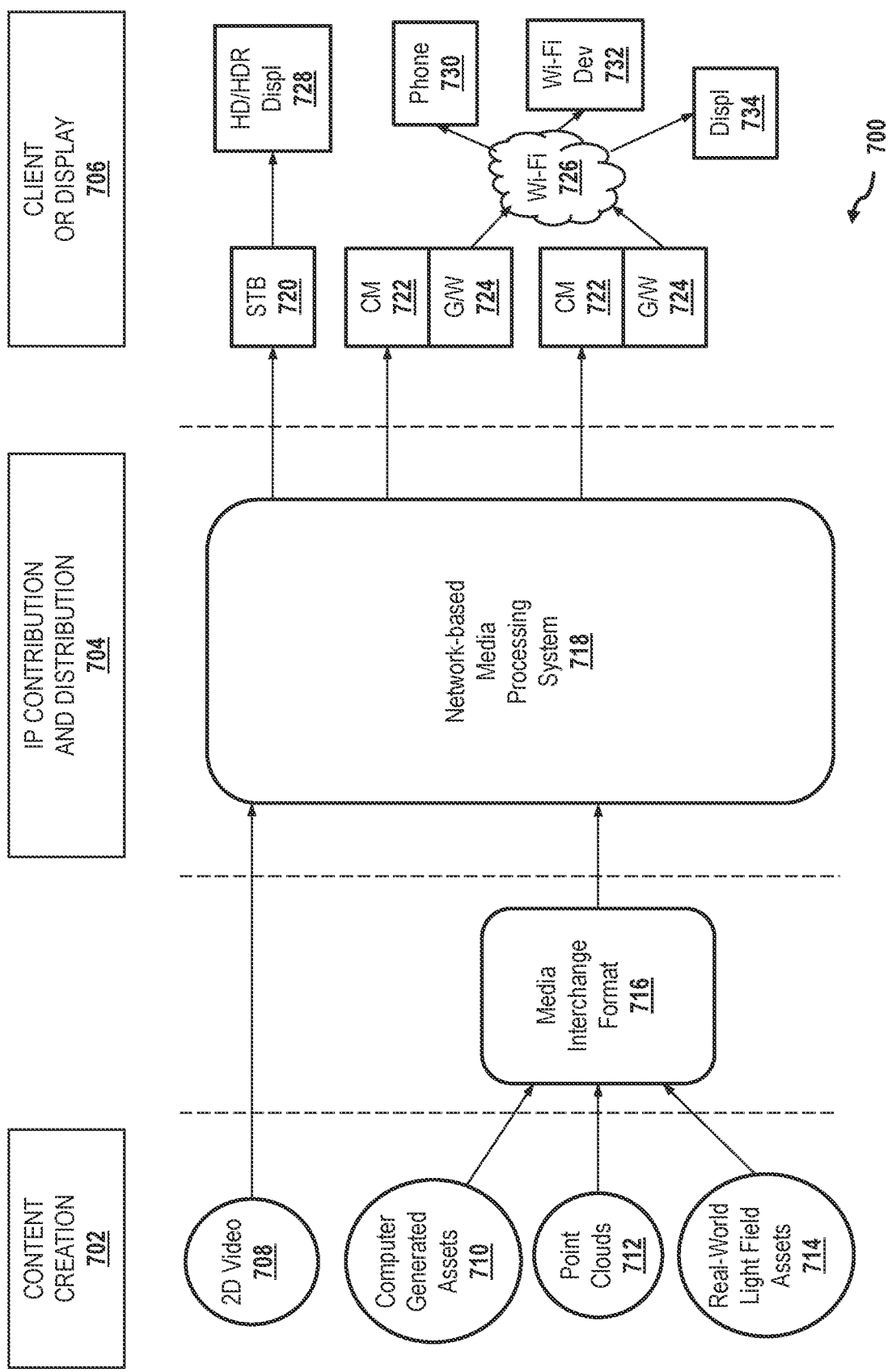
FIG. 7 illustrates a distribution network for network-based media processing in an end-to-end workflow, in accordance with an embodiment.

FIG. 7 illustrates a distribution network 700 for NBMP in an end-to-end workflow. Distribution network 700 represents an end-to-end workflow architecture for the MIF and NBMP embodiments described herein, and includes a content creation section 702, an IP contribution and distribution section 704, and a client or display section 706. Content creation section 702 may include at least one of 2D video content 708, computer-generated assets 710, point clouds 712, and real-world light field assets 714. In the exemplary embodiment, computer-generated assets 710, point clouds 712, and real-world light field assets 714 are then input into MIF 716 prior to processing and/or distribution by an NBMP system 718. In an exemplary embodiment, 2D video content 708 may be directly input into NBMP system 718 instead of MIF 716.

Client/display section 706 is configured to receive content from NBMP 718 at one or more STBs 720 and one or more modems 722 associated with respective gateways 724, and configured to communicate with a Wi-Fi network 726. Content received at STB 720 may then be sent to a first display 728 (e.g., HD or HDR), and content received at modems 722 may be sent to one or more of a phone system 730, one or more Wi-Fi devices 732, and one or more second displays 734.

In exemplary operation of network 700, the end-to-end workflow utilizes a unifying MIF that is advantageously able to store not only 2D audio/video assets, but also assets that support the entire Milgram scale. In some embodiments, the MIF is a primary MIF, and may functionally operate as a manifest MIF for one or more secondary MIFs. That is, the primary MIF may be configured to reference other secondary MIFs, and thus the primary MIF may represent a hierarchical manifest MIF returned by the media origin server (described further below with respect to FIG. 8). In other, or additional embodiments, the MIF functions to provide assets in CGI formats, and may therefore represent a 6 DoF MIF for objects, textures, point clouds, materials, camera parameters, etc. Media resources may, for example, therefore be in the form of traditional URIs, CCN interests, and/or references to other heterogenous MIF resources. For example, where the MIF extends the reach of ORBX, the MIF is further advantageously capable of referencing CCN interests Each of these known conventional displays supports one or more media formats at potentially different resolutions, with different Degrees of Freedom, depending on the particular application. Additionally, each of these conventional displays represent various use cases including games, interactive telepresence, changes in point-of-view (e.g. 360-degree viewing), and passive viewing (e.g. watching long-form content such as a movie). Each such display, media format, use case, and application thus contributes to the particular requirements for networks to support NBMP.

Accordingly, the present systems and methods provide an innovative network for implementing NBMP, and which is capable of supporting a variety of input media formats, to service heterogeneous clients to meet the requirements of different qualities of experience for different qualities of service. One such exemplary architectures described below with respect to FIG. 8.

Figure 8:
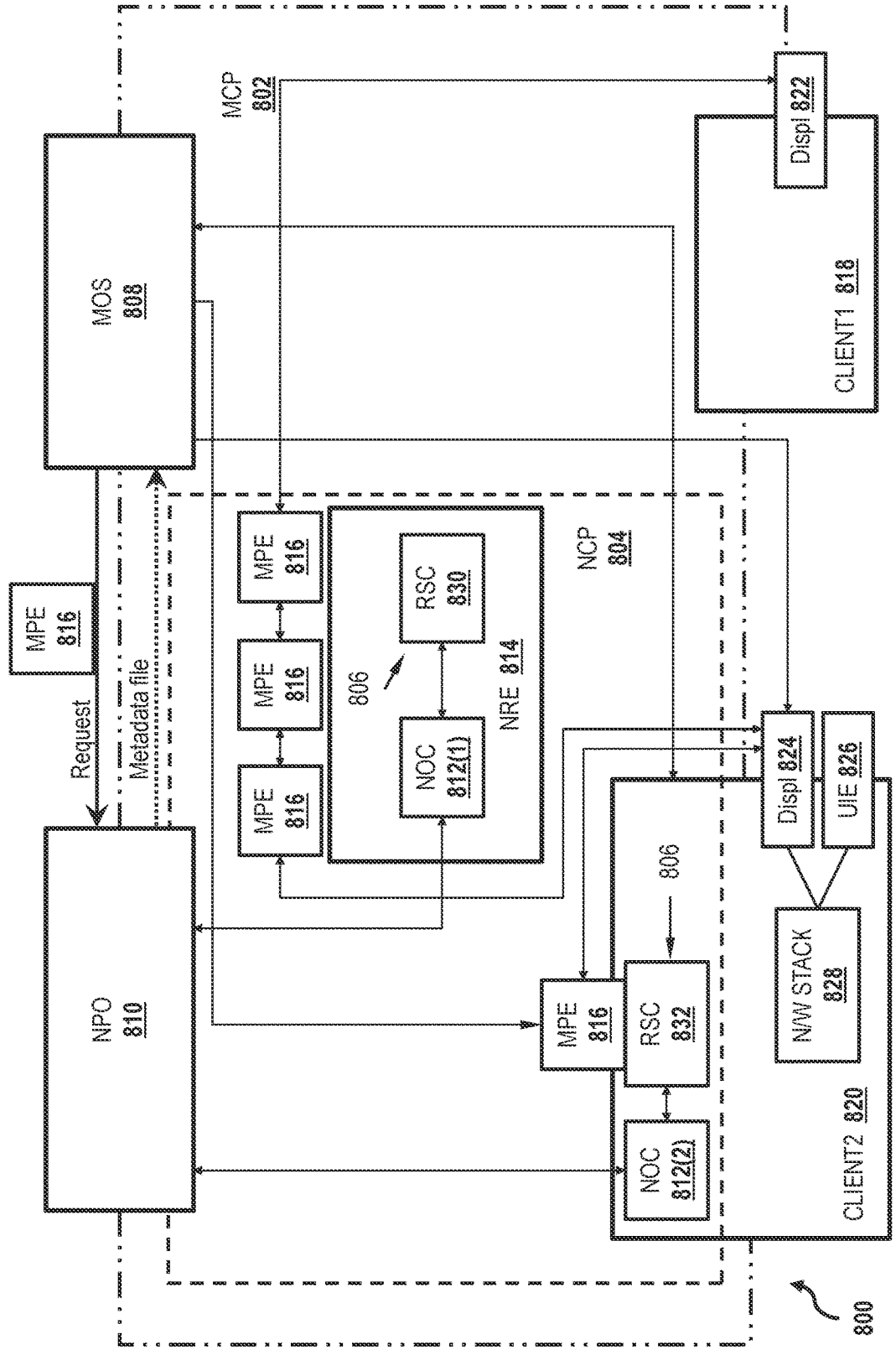
FIG. 8 is a schematic diagram of a network-based media processing architecture, in accordance with an embodiment.

FIG. 8 is a schematic diagram of a network-based media processing architecture 800. In an exemplary embodiment, architecture 800 includes a media control plane (MCP) 802, a network control plane (NCP) 804, and a media data plane (MDP) 806. In this example, MCP 802 and NCP 804 may represent architectural control planes, and MDP 806 may represent an architectural data plane. That is, in the exemplary embodiment, architecture 800 is realized through implementation of various application programming interfaces (APIs) that execute functional elements of the two architectural control planes 802, 804 and the architectural data plane. In some embodiments, one or more of the several elements of architecture 800 are implemented through dedicated hardware components. In other embodiments, except where otherwise specified, the elements are implemented through software modules. In at least one embodiment, architecture 800 is realized through a combination of hardware and software elements.

MCP 802 includes a media origin server 808, and NCP 804 includes a network platform orchestrator (NPO) 810, a network orchestration client (NOC) 812, a network resource element (NRE) 814, and a plurality of media processing elements (MPEs) 816. In the exemplary embodiment depicted in FIG. 8, architecture 800 operates with respect to a first client 818 and a second client 820. First client 818 includes a first display 822 and second client 820 includes a second display 824. First and second displays 822, 824 may include, for example, display elements and/or audio elements (not separately shown). In this example, second client further includes at least one user interface element (UIE) 826 and a network stack 828. Also in this example, architecture 800 includes a first media resource 830 located within an NRE 814, and a second media resource 832 located within second client 820. For purposes of the description herein, the terms "network resource element" and "media processing element" are used for clarity of explanation, but should not be considered in a limiting sense. That is, in some instances, a "media processing element" may be correctly referred to as a "network resource element."

In the example illustrated in FIG. 8, media resources 830, 832 may include one or more of a URI (or interest name in a content-centric network), security token, transfer protocol, media data, and a manifest file. For ease of explanation, this example as described with respect to an IP-based network (e.g., IP network distribution section 506, FIG. 5), which may utilize manifest files containing URIs. A person of ordinary skill in the art will understand though, that the innovative principles described are also applicable to a content centric network (CCN) in which an "interest name" may be utilized in a manner functionally similar to the use of the manifest file/manifest request from content producers and caches in the IP-based network. That is, the general concepts of efficient media delivery, as illustrated in the NBMP architecture of FIG. 8, may be applied to a CCN as well.

In the exemplary embodiment, the respective elements of architecture 800 may include some conventional hardware components and software functionality, but implemented according to the systems and methods described herein for an NBMP environment. For example, MCP 802 of the framework of architecture 800 may be configured to function as a command and control channel to manage delivery of the media content, including synchronization of various media resources (e.g., media resources 830, 832), and also to signal distribution of the content. In an embodiment, one or more sets of network protocols (e.g., HTTP2+JSON, etc.) may be used for this control channel management.

In contrast, MDP 806 may be configured to function as a channel for distribution of media resources 830, 832 needed for a network media client to render or present the final content to a user. In this example, the phrase "network media client" (NMC) is used to generally refer to the logical combination of the respective functional capabilities of displays 822, 824, NRE 814, UIE 826, and/or NOC(s) 812 collectively. Each NMC may, for example, be integrated onto a single physical device, or may be optionally represent different functionalities distributed across multiple physical devices. Examples of integrated NMCs include mobile handsets, mobile and standalone HMDs, AR glasses, fixed (e.g., in-home) 2D displays (without set top box or game console), and single panel light field displays. Examples of distributed NMCs include connected (e.g., through a set top box or game console) fixed 2D displays, multi-panel light field displays, tethered HMDs, and game systems with or without gaming accessories (e.g., joysticks, gloves, handheld controllers etc.). In some cases, a particular NMC may have direct access to one or more MPE(s) 816. In an exemplary embodiment, one or more sets of network protocols may be used to deliver media content from MDP 806, which network protocols may be different from the protocols used by MCP 802.

In an embodiment, MOS 808 is configured to function as a server for hosting media resources 830, 832 requested by a particular NMC. In some embodiments, MOS 808 may be further configured to function as a resource server for other resources referenced in a Media Interchange Format (MTF) file. In some cases, MPEs 816 alternatively, or additionally, function as resource servers. In an exemplary embodiment, MPEs 816 are configured to be the element responsible for processing and/or rendering media resources 830, 832 that will ultimately be delivered to display 822, 824, respectively (e.g., the display and/or audio elements in the NMC) for presentation. In at least one embodiment, implementation of the MIF is performed using a Media Translator Function (MTF), which represents a helper function used to convert media formats in one MIF to another media format in an output MIF.

In some embodiments, a plurality of MPEs are daisy-chained between the respective resource server and the ultimate display 822 or 824 (e.g., proximate NRE 814 in this example). In at least one embodiment, one or more MPEs 816 exist in NMC 804, and elsewhere within architecture 800, to support clients 818, 820. A particular MPE 816 may, for example, be specific to one client, or may alternatively be configured to serve multiple clients. In some instances, an MPE 816 may be relocated within architecture 800 based on the requirements of the particular client and/or the state of the network.

In the exemplary embodiment, NRE 814 represents a physical or logical device having computational and/or storage capability (e.g., a CPU, GPU, etc.), and may also include a supporting power supply. An NMC may, for example, include one or more NREs 814 within its logical configuration. The NMC may also include at least one display element representing a physical, visual display for presenting visual media to an end user, and at least one audio element representing a physical channel (e.g., a loudspeaker).

According to architecture 800, MCP 802 functions to ensure that all requests from the network client (e.g., clients 818, 820) may be fulfilled to satisfy requirements for a particular quality-of-experience or quality-of-service (QoS) as determined by a particular network service provider, such as according to a contract with a particular customer. In this example, MCP 802 utilizes NCP 804 to orchestrate the network for each such client request, and utilizes MDP 806 to perform any required processing of the media prior to delivery of the media to the client (e.g., to ensure that the media provided to the client matches the capabilities of the respective display thereof). As described above, the various network protocols respectively implemented by the MCP, MDP, and NCP are not necessarily the same for each plane.

In further exemplary operation, MCP 802 is managed by MOS 808, which includes a primary responsibility to respond to client requests for access to specific media resources (e.g., media resources 830, 832) such that the media resources are tailored to the characteristics of the supported features of that client (e.g., display resolution, color gamut, bit-depth, HDR settings, camera viewport, etc.), and are accessible to that client in a way that satisfies the requirements for the particular application of the user of that client device (e.g., passive vs. interactive experience, using display 822 or 824). In this exemplary operation, MOS 808 further utilizes NPO 810 in NCP 804 to request network resources that will support the requirements for the particular client request. Accordingly, in the exemplary embodiment, MOS 808 is configured to manage the sequence of MCP 802 according to the type of client (e.g., constrained vs. non-constrained), the manifest, the MIF, the media streaming request (e.g., including a client profile and/or session ID, and also coordinates) and the particular media resource UIE.

Accordingly, given the introduction of many new types of display that support content beyond 2D, an NMBP network client (e.g., first client 818) may be constrained such that it does not contain sufficient resources to process the high-level media, or else may be non-constrained by available local resources (e.g., GPU, CPU, memory, storage, etc.) to process the media locally (e.g., second client 820). According to the innovative configuration of architecture 800, and further explained with respect to the innovative systems and methods illustrated in FIG. 9, below, the present embodiments advantageously enable constrained local clients, through the NBMP principles described herein, to process high-level media content (e.g., AR, AV, VR, light field) in a significantly less constrained, or non-constrained manner. That is, through NBMP architecture 800, first client 818 (constrained) is enabled to process media comparably to second client 820 (non-constrained).

Figure 9:
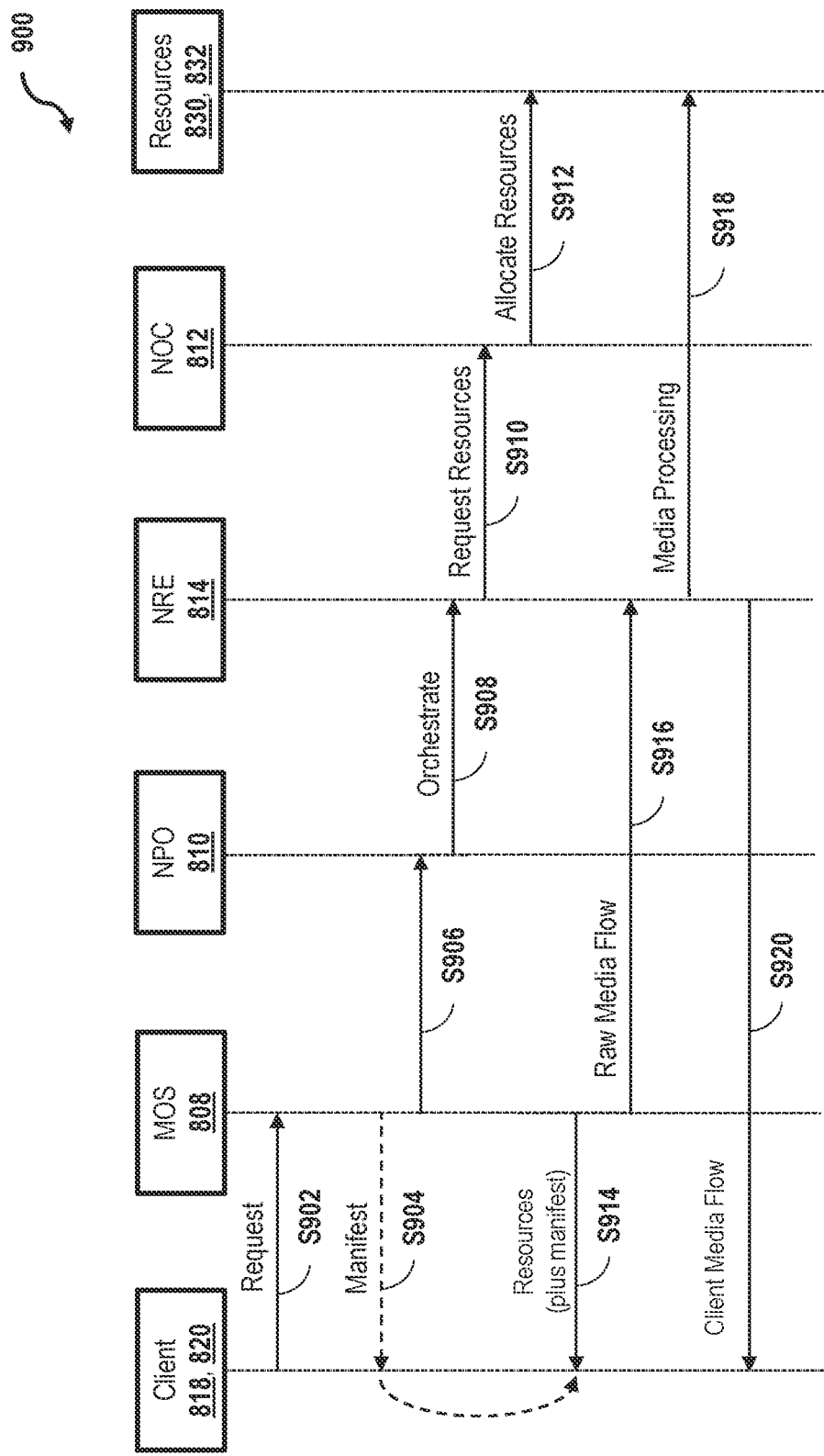
FIG. 9 is a sequence diagram of a media control plane process for the network-based media processing architecture depicted in FIG. 8.

FIG. 9 is a sequence diagram of a media control plane process 900 for NBMP architecture 800, FIG. 8. In an exemplary embodiment, process 900 is executed with respect to one or more elements of architecture 800, including first client 818, MOS 808, NPO 810, NRE 814, NOC 812, and first media resources 830. Unless otherwise described herein to the contrary, process 900 may execute one or more of the following steps in any particular order, sequentially or in parallel, and/or substantially simultaneously.

Process 900 begins at step S902, in which first client 818 transmits a client media request to MOS 808. In an exemplary embodiment of step S902, the transmitted request includes at least one of the client profile information, the session ID, and a media name (e.g., the URI). The client profile information may, for example, include a client profile that sufficiently describes relevant client features, such as display resolution, supported HDR curves, supported color gamuts, descriptions of available local resources (if any) for processing the media, description of the audio element (if any), number of audio channels (if any), etc. The client media request may further include a description of the QoS required by the client application, as well as a description of the application itself. Step S904 is optional. According to step S904, MOS 808 may be configured to send the manifest to the particular client. In an exemplary embodiment of step S904, the manifest includes a list of URIs for resources.

In step S906, MOS 808 requests, from NPO 810, network resources that will support the requirements for the client request received in step S902. In step S908, NPO 810 orchestrates NRE 814 to, in step S910, request resources from NOC 812(1). In step S912, NOC 812(1) allocates first media resources 830 for first client 818. In step S914, MOS 808 provides first media resources 830 to first client 818. In an exemplary embodiment of step S914, first media resources 830 are provided together with the manifest provided in step S904. That is, in this example, steps S904 and S914 may be performed simultaneously. In step S916, MOS 808 enables a raw media flow to NRE 814. In step S918, NRE 814 performs additional processing on the raw media. In step S920, NRE 814 enables a client media flow to first client 818.

In an exemplary embodiment of process 900, a set of metadata is utilized throughout the several steps to manage the various communications (i.e., requests, responses, etc.) across the active elements of control planes 802, 804, and to enable abstraction of these active elements from implementation-specific functions that are employed to directly process and/or access the media (e.g., renderers, transcoders, 3D modeling tools, etc.) for NBMP. In at least one embodiment, orchestration of the network (in response to the MOS processing a client request) may also leverage blockchain technologies. In the exemplary embodiment, once the media is requested by a client, the media will be reliably delivered in a MIF format.

According to the advantageous systems and methods described above, the format of the media that is input to the system (i.e., the source) need not be the same as the format that will be consumed by the end-user client (i.e., the sink). That is, the present embodiments are able to reduce the complexity of having to support M output media formats for each of N input media formats by leveraging the MIF as the interchange format. The MIF may include, for example, formats such as ORBX and/or Immersive Technologies Media Format (ITMF). In an exemplary embodiment, the MIF is supported by a collection of MTFs that enable translation of a variety of formally or informally specified media formats (e.g., USD, USDZ, VDB, FBX, input ISOBMFF, JPEG, EXR, etc.) to the MIF, and from the MIF to an output (e.g., a distribution section) media format (such as DASH, MPEG2 TS, MMT, distribution ISOBMFF, ORBX targeted for a specific light-field display, etc.). According to this innovative framework, the present systems and methods are capable of advantageously deploying a diverse set of services from essentially any service provider, and for essentially any and device/display, irrespective of the local capabilities of that device/display.

MPEG Design Considerations for Supporting Visual Content

The foregoing design considerations are therefore of particular use with regard to the support of visual content for MPEG-I Phase 1a use requirements. That is, MPEG-I Phase 1a will leverage existing networks and infrastructures to deploy interoperable services for 360-degree video that includes captured video (all natural), but with limited ability to support movement of the viewport desired by the user. In MPEG terms, this limited ability is considered to represent 3 DoF, namely, the yaw, pitch, and roll of the user's head wearing an HIVID, and/or the corresponding changes of the viewport on a 2D display device (e.g., tablet, smartphone, television, etc.) supported by other manual interaction from the user viewer (e.g., a finger swipe, rotation of the device, etc.). The present embodiments are therefore advantageously able to implement existing MPEG raster-based technologies, with respect to this phase, including without limitation HEVC, AVC, ISO Base Media File Format, DASH, MMT, and/or Application Formats such as OMAF or CMAF, to support this end-to-end workflow, and also to leverage existing end-to-end interoperable workflows established for known AV implementations.

The foregoing design considerations are therefore also particularly useful for supporting visual content with respect to MPEG-I Phase 1b. In Phase 1b, for example, a desired use case involves enhanced support of 360-degree video to include a limited amount of volume into which a single user can navigate. While this use case does not provide full navigation into a volumetric scene, the limited navigation may nevertheless be realized by raster-based representations of natural world content, that is, provided that there is some amount of corresponding depth-based information (derived or explicit) to accompany this raster image data. Similar to the Phase 1a case, the present embodiments are again advantageously able of implementing existing MPEG raster-based technologies in this phase as well, including without limitation HEVC, AVC, ISO Base Media File Format, technologies-under-consideration in JVET, etc., to leverage end-to-end interoperable workflows to address this use case.

The foregoing design considerations are of still further advantageous use with respect to the support of visual content for MPEG-I Phase 2. That is, the present embodiments enable a unifying data representation for both natural and synthetic content across the entire Milgram scale (e.g., FIG. 7). Within the timeframe supported by MPEG-I Phase 2, there is a significant need in the industry for supportive immersive visual technologies that enable users to fully navigate into a volume of visual information, including realistic movement around objects within that volume. Moreover, to support AR applications, objects in such volumes may be real-world (e.g., captured from a camera) or computer-generated information (CGI). The present embodiments thus advantageously provide for use cases involving 6 DoF, simultaneously and seamlessly, for both real-world and synthetic content along the complete continuum of the Milgram scale.

At present, some practical limits for MPEG raster-based technologies have been conceptually reached, primarily due to the fact that these conventional technologies have been designed to support raster-based legacy camera acquisition systems, such as single-view video cameras, stereoscopic cameras, and cameras with integrated depth sensors for creating coded bitstreams for display on 2D flat-screen displays. The content from these conventional systems therefore also primarily includes 2D real-world information in a raster format, which is not easily coupled tightly with synthetic content, and particularly in a 3D format, for AR applications.

However, although the conventional raster image-based formats do not readily lend themselves to being tightly coupled with synthetic content (i.e., in geometric-based formats), geometric-based formats, on the other hand, are more readily able to support raster-based formats, as long as a sufficiently dense set of image samples is captured by the relevant image acquisition process. In some cases, the image acquisition process for geometric-based formats may be significantly more complex than the image acquisition process employed in legacy video workflows. For example, some geometric-based image acquisition processes may be configured to additionally capture light rays being reflected from the scene, and the particular scene may be both static and dynamic during acquisition. With respect to light field image acquisition in particular, applicable formats of natural world content include without limitation plenoptic video (e.g., Fraunhofer, Lytro, etc.), high-density camera arrays (e.g., Fraunhofer, ULB, etc.), and sparse-density camera arrays (e.g., Technicolor). In some cases, the relevant image acquisition process captures data from unique physical hardware, such as from a rotating camera rig supporting two cameras, for example.

Accordingly, there is a further need to develop new techniques of capturing natural content along an increasing trajectory for recording significantly more and more information about the specific light properties being reflected from the targeted scene, and for both still and dynamic scenes. The rapidly increasing richness of such captured information further indicates a need for development of algorithms that equally able to derive geometric representations of the acquired scene, and from these derivations, then capture still further information about the reflectance properties of the objects in the scene. Geometric-based representations therefore better facilitate the mixture of real-world and synthetic content, as illustrated below with respect to FIG. 10.

Figure 10:
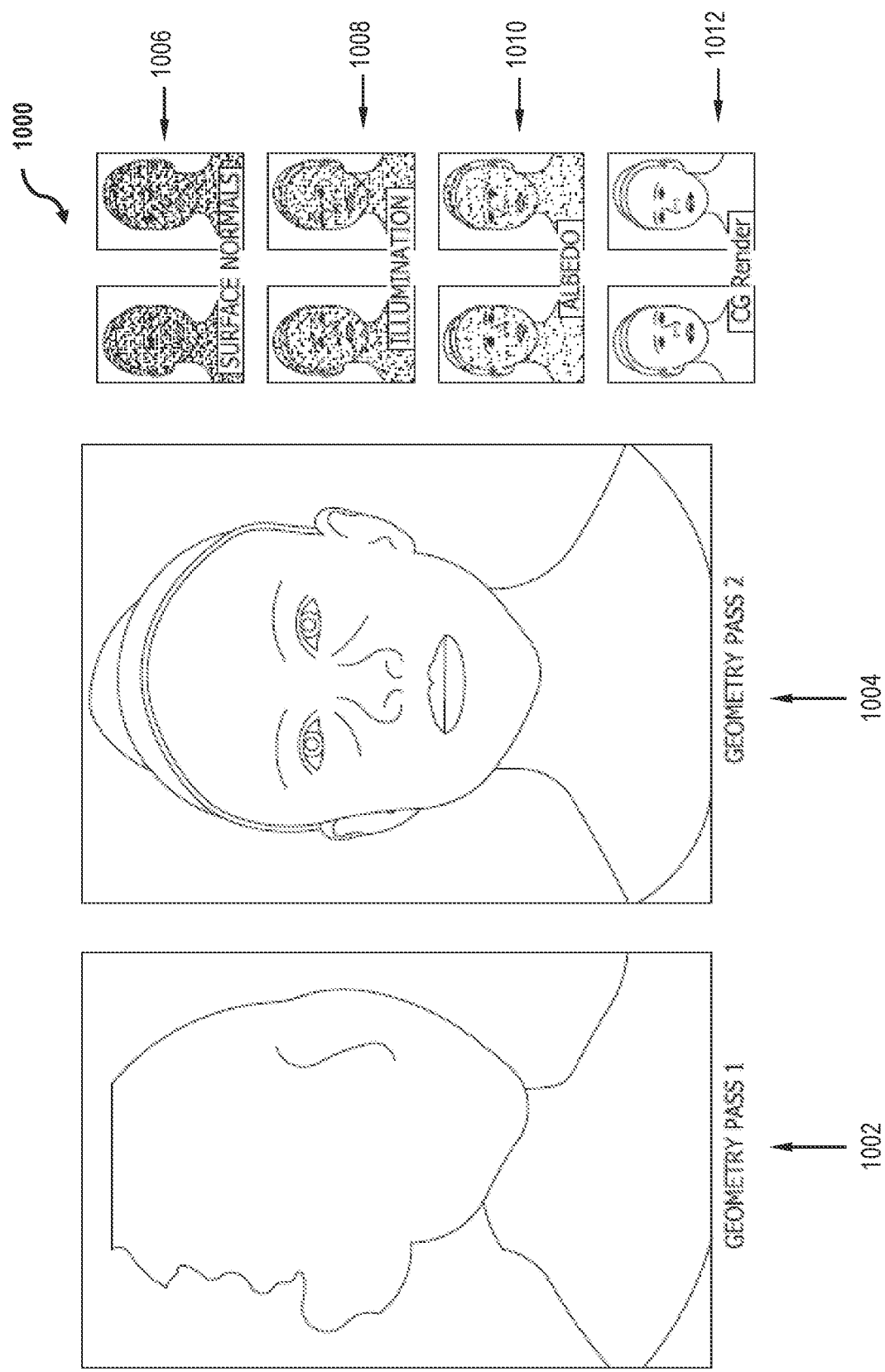
FIG. 10 depicts a display rendering of a real-world image using a synthetic representation as opposed to raster representation.

FIG. 10 depicts a display rendering 1000 of a real-world image. In the exemplary embodiment, display rendering 1000 is realized using a layered approach for a geometric-based representation of the real-world image. Rendering 1000, for example, acquires an image of a three-dimensional real-world object using of at least a first geometry pass 1002 and a second geometry pass 1004, and one or more of a captured surface normals layer 1006, illumination layer 1008, albedo layer 1010, and a CG rendering layer 1012. Accordingly, each of these additional layers adds greater photorealism to the acquisition of the final object captured as display rendering 1000. According to the embodiments described above, the layered approach of rendering 1000 may be further leveraged into existing gaming platforms that already include many algorithms that enable relighting of textured surfaces to support environments with 6 DoF. That is, as described herein, an image acquisition process capturing a display rendering according to FIG. 10 may be leveraged into various gaming algorithms along the Milgram scale, even if processed using different formatting protocols.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Low Latency Networks and Cloud-Based Hybrid Rendering

Although the proceeding embodiment, which represents a unifying geometric-based format for both real-world and synthetic-content (e.g., which is capable of leveraging existing game platforms for the support of 6 DoF within a volume of visual information) that can be regarding as a potential near-term solution for the data formatting, compression, and rendering challenges associated with AR, conventional network capabilities nevertheless experience a significant challenge to support real-time streaming of such a format. This challenge is proven daunting in the industry. Nevertheless, low latency networks, cloud-based rendering, and supporting technologies such as Software Defined Networks (SDN), and Network Function Virtualization (NFV) are already in development (e.g., 5G implementations) and continue to rapidly mature. Fundamentally, the ability of a network to robustly support low-latency applications such as game streaming, 6 DoF, and AR applications is an optimization between the bandwidth with which that network is capable of supporting vs. the latency that can be achieved with edge computing.

With respect to game platforms in particular, MPEG should anticipate that the "heavy lifting" of this type of platform such as Unity can be transitioned to cloud computing, and that some of the "local" rendering to deliver viewports required in response to the viewer's interactions with the content can be performed in the home or on the device.

The preceding discussion sets forth techniques for developing a unifying format of geometric-based data representations for MPEG Phase 1 uses. The embodiments herein are also useful with respect to MPEG-I Phase 2. That is, the unifying media format described herein is capable of supporting both spatial (e.g., raster or point-cloud) and geometric-based data representations. Accordingly, implementation of such a unifying format will facilitate the development of AR applications which require a tight coupling between natural and synthetic contents. Furthermore, the present systems and methods enable a geometric-based format to be configured to leverage the rich ecosystem of gaming platform algorithms that are designed to provide fully immersive experiences, including 6 DoF for volumetric scenes. Low latency networks that support minimal photon-to-motion requirements may also be designed around hybrid remote and local rendering systems (e.g., game engines, such as Unity and Unreal). The present embodiments further advantageously enable the system to optionally perform rendering entirely within an access network.

The access network may, for example, represent a cable network, which may be managed by a multiple system operator (MSO). The present embodiments are further applicable to design considerations of such cable networks, and particularly with respect to cable networks that support, or intend to support, fully immersive VR and AR applications. Furthermore, the need has been expressed within the cable industry for improved technology to support immersive displays beyond VR/AR applications, such as holographic displays which are expected to be in more common use within the next several years. Accordingly, game engine implementations have evolved recently to include core functionalities that support 6 DoF environments to provide photorealistic visual information and visual effects (e.g., for cinema).

In an embodiment, the systems and methods described herein are applicable for 2D and 3D graphics format renderers that included geometric and spatial data. Decoders and renderers for 2D video include: physics engines to support complex natural processes (e.g., fire, water movement/flow, movement of fine textures such as hair/fur, flow of light/ray-tracing); scripting (e.g., for games); animation; streaming, threading, and memory management; scene graphs to organize the logical spatial representations of objects within a scene (which may or may not include the spatial data itself); and support of virtual file systems for visual scenes requiring petabytes (PB) or terabytes (TB) of data, which is larger than the present day physical file sizes limitations. Accordingly, there is a need to seamlessly leverage all such decoding/rendering features into a game engine to support immersive media applications and displays. Furthermore, the variety of applications targeted by the cable industry will require support for both time-based and non-time-based visual media. For purposes of this discussion, non-time-based visual media includes visual content that need not be time-based, but may instead be driven by user-initiated actions. For example, such non-time-based use cases include: mixed-reality telepresence; education; interactive games; and industrial design. For the examples of such use cases are described below with respect to Table 1.

The further development of 6 DoF and truly immersive applications, beyond omnidirectional video, will leverage new paradigms regarding how visual content is captured or acquired, distributed, and rendered. Moreover, because such new visual content will include both natural-scene and synthetic (CGI) objects, there is increasing desire to develop new technologies to seamlessly support applications using this visual content, but in a unifying format that preserves the material properties of each object for subsequent manipulation and rendering. The standardization of this format is important, so that a broad interchange of content assets may be facilitated.

These new rendering paradigms will be particularly important for 6 DoF applications. Conventional six DoF application rendering paradigms include present day VR games, which are rendered by computation-intensive game consoles (or PCs equipped with game engines), capable of supporting captured natural content, CGI content, and procedural-based instructions (i.e. scripts). Similar to the content described above, the 6 DoF content may or may not be time-based or not. This content may also be entirely synthetic, entirely natural, or a mixture thereof. Conventional game rendering engines are widely utilized in the area of visual effects (VFX) rendering, especially for long-format cinematic features.

Shifting paradigm for capture of natural-world visual information in 6 DoF applications can be seen by the rapidly evolving and emerging acquisition systems for both consumer-grade and professional-grade cameras. These emerging cameras/camera systems are typically equipped with multiple image sensors, optional depth sensors. In some cases, emerging camera systems include arrays of discrete cameras, and particularly with respect to professional production applications. When used with respect to 6 DoF applications, the use of multiple sensors enables the capture of significantly more information regarding light reflected from the captured scene. This additional information facilitates photogrammetric and AI-based procedures for the extraction of features in the scene, including individual objects, material properties for the objects, and the depth of the objects. Within the MPEG context, conventional image acquisition systems are known with respect to light field and FTV uses, and are now being applied to MPEG-I-visual Phase 2 usage.

With this increasing technological advancement in the image acquisition stage, CGI content for 6 DoF applications is also becoming more photorealistic (see FIG. 10, above). Examples of content authoring and 3D modeling tools for 6 DoF include Blender, Photoshop, C4D, Houdini, After FX, and Nuke +. These tools are maturing to the point where they are capable of producing enough information to convey "lifelike," and other natural properties of objects within an acquired scene, whether natural or synthetic. That is, objects generated by such 3D tools may subsequently be rendered to produce photorealistic representations of synthetic scenes. The present day evolution of these tools have (i.e., to create photo-realistic content from CGI techniques) represents another paradigm shift within the field.

Nevertheless, procedural-based modeling tools are presently recognized as being the most efficient tools for 6 DoF representations. Content which may be described by procedural-based models, vector graphics, or other scripting formats, may be represented more efficiently than by using non-procedural-based modeling tools. That is, for many natural objects and shapes, it is more efficient to articulate and transmit the procedural instructions for photorealistic rendering to a game engine, as opposed to having to capture, compress, and transmit the spatial representation of the same object(s) across a network.

The single unifying media format of the present embodiments is therefore of additional use with respect to game-engine rendering systems, and particularly with respect to distribution and interchange of 6 DoF/immersive visual assets across a commercial cable network. The single unifying media format may be used for the description of the scene, irrespective of the particular visual data model used (e.g., procedural-based, geometric, or spatial, or point clouds/light fields/2D video). Accordingly, the supported data may be either time-based or non-time-based, and the unifying format is able to support rich and immersive services for VR/AR applications (including games), while further enabling the leverage of existing already-mature ecosystems of scheme-engine renderers.

The accessibility and maturity of this unifying format is also of particular value in support of user-generated or professionally-generated content subject to Type-1 licensing terms. In order to be accessible to the widest population of potential users, this unifying format provides the further advantage of being already supported by a substantial portion of existing stakeholders in the gaming industry, while also enabling thorough vetting by new (or existing) stakeholders, which significantly aids the bootstrapping of AR/VR services for a variety of markets.

The single media format of the present systems and methods is configured to meet conventional cable requirements for 6 DoF media formats for use in VR/ARe services and immersive displays. That is, the single media format: (1) is consistent with Type-1 licensing to maximize accessibility by content creators; (2) is capable of articulating important aspects of the physical acquisition system (e.g., camera parameters); (3) provides a single open format for seamlessly describing a rendered scene including various types of media (e.g., light fields, point clouds, 3D graphics, meshes, geometric representations, procedural-based representation models, etc.); (4) configured for use as a single format for rendering scene content on game engines; (5) is supported and/or compatible with WebVR; (6) is capable of being vetted and widely deployed by existing stakeholders in game ecosystems, such as by game engines and 3D modeling and authoring tools for interchange of VR/AR assets and VFX assets; (7) provides node graph support for compositing scenes including various types of media; (8) supports widely deployed and open media formats for 3D meshes, graphics, and spatial data; (9) supports other open formats to facilitate rendering, including without limitation PNG, EXR, GLTF, FBX, OBJ, OSL, etc.; (10) sports open formats for scripting of games; (11) may be agnostic to underlying data compression formats, if any are used; (12) may be agnostic to whether the underlying media is time-based or non-time-based; (13) supports DRM, and particularly for professionally-produced content; and/or (14) serves as a virtual file system for collections of large assets (e.g., TBs or PBs).

According to this single media format, earlier-phase design considerations are extended to the MPEG-I Phase 2 the embodiments described above. The single media format meets present requirements of the cable industry in support of 6 DoF implementation, as well as other more immersive media applications, and also for holographic displays that are expected to emerge within the next several years. The present single media format may therefore be open format, that is, consistent with Type-1 licensing, and may be readily configured to describe a scene to be rendered on a game engine. This single media format is of particular use with respect to the interchange of VR/AR assets in commercial cable networks, as described above, and readily lends itself to codification for adoption by cable industry network operators, vendors, partners, and other stakeholders.

At present, a number of use cases are being studied by the cable industry for 6 DoF VR and AR services. These use cases derived from variations of three broader categories: (i) telepresence; (ii) gaming; and (iii) narrative (story-telling), and have also been mapped to the latest list of MPEG-I Phase 2 use cases, as indicated below in Table 1. Table 1 further illustrates a comparison of these MPEG use case mapping with mapping according to the present systems and methods.

TABLE 1

| MPEG Use Case Title | Present Use Case |
| --- | --- |
| VR gaming from natural content | MR Game |
| Astronomy | Virtual Tour Artificial World |
| Virtual Museum | Virtual Tour Real World |
| Future cinema | Virtual Storytelling |
| Immersive 3DTV | Virtual Storytelling |
| Free viewpoint live event | Virtual Tour Real World |
| Theme park | Virtual Tour Artificial World |
| Exhibition in public areas | Virtual Tour Real World |
| Science Signage | Virtual Tour Real World |
| Bi-directional communication | Virtual Telepresence |
| Tele-videoconference | Virtual Telepresence |
| Virtual joint restaurants, cafes, bars | Virtual Telepresence |
| Virtual classroom | MR Telepresence |
| Virtual stadium | Virtual Tour Real World |
| Monitoring (Referee playback) | Virtual Tour Real World |
| Product design | MR Telepresence |
| Omnidirectional 360 viewing w/FN (same as FV live) | |

The use case descriptions featured in Table 1, above, include telepresence variants, game variants, and narrative variants. A "Synthetic Telepresence," for example, represents a case of multiple participants being represented by 3D avatars, and participating in a virtual meeting in a 3D, computer-generated, meeting space of the participants' choice. Such meeting spaces also may be optionally customized for each participant, and the participants were then able to interact in real-time, both visually and aurally. The participants in a Synthetic Telepresence may also optionally interact with 3D objects (within the meeting space) that are also computer generated.

A "Virtual Telepresence," on the other hand, refers to a case where multiple participants participate in a virtual meeting in a meeting space that represents one or more physical locations. The meeting space May be optionally unique for each participant ("my office," "your office," "neutral" meeting rooms, etc.), and the participants are able to interact in real-time, both visually and aurally, and further may optionally interact with real-world objects.

An "MR Telepresence" though, represents a case where multiple participants are represented either by (images of) themselves or their 3D avatars, and participate in a virtual meeting in a 3D meeting space of their choice, which may be either a meeting space that is computer-generated or a physical location. Similar to the other telepresences, the meeting space may be optionally unique for each participant, who are able to interact with one another in real-time, both visually and aurally, and optionally also with 3D objects, whether real-world or computer-generated.

A "Traditional Game" use case refers to multiple participants being represented by their 3D avatars, and participating in a virtual game in a 3D game space that is computer-generated. In this use case, the game space may be uniquely rendered for each participant, and the participants are able to interact with one another in real-time, both visually and aurally, and with 3D objects in the game that are also computer-generated. In contrast, an "MR Game" refers to the case where multiple participants are represented either as themselves or their 3D avatars, and participate in a virtual game in a 3D game space that is that is either a physical location or computer-generated. As with the Traditional Game, the game space may be uniquely rendered for each participant, and the participants are able to interact in real-time, both visually and aurally, with each other and with 3D objects in the game, which objects may be computer-generated or real-world objects.

A "Virtual Storytelling" use case refers to one or more users viewing a virtual performance in a 3D space that is computer-generated, and this space is uniquely rendered for each user. The users are thus each able to view and hear the performance from a unique perspective. The performance includes 3D objects that are also computer-generated, and the performance space itself, as well as objects within the performance, may change over time. In contrast, an "Interactive Storytelling" use case refers to one or more users watching a virtual performance in a 3D space that is either a physical location or computer-generated. The space is uniquely rendered for each user, and the users are each able to see and hear the performance from a unique perspective, and may also interact with the performance to affect the outcome of the performance. The performance includes 3D objects that or computer-generated or real-world objects, and the performance space itself may change over time, as may the objects in the performance, which may be potentially in response to actions of the users viewing the performance.

"Untethered Augmented Reality" refers to the case of a user wearing a pair/set of AR glasses to enhance the user's daily experience in the world. The AR glasses are able to convey the natural world around the user, and combine the conveyance of the natural world with 2D and 3D objects that are computer-generated, and composited appropriately into the natural world respecting the depth and occlusion of other objects, whether natural or computer-generated. The user in this case is able to interact with the natural world and the computer-generated objects, which should continue to be generated respecting depth and occlusion. "Tethered Augmented Reality," on the other hand, refers to the case of a user wearing a pair/set of AR glasses to enhance the user's experience in a non-mobile environment (e.g., in a home, workplace, office, etc.). The glasses convey the natural environment in which the glasses located in operating, combined with 2D and 3D objects that are computer-generated and composited appropriately into the natural world (i.e., also respecting depth and occlusion of other natural and computer-generated objects). The user May interact with the natural environment and the computer-generated objects (i.e., respecting depth and occlusion).

A "Virtual Tour Real World" refers to the case of one or more users being able to tour a real-world location (e.g., museum, art gallery, tourist attraction, etc.) from a remote location. The real-world location is thus uniquely rendered for each user, and the users are each able to see and hear the real-world location from a unique perspective. A "Virtual Tour Artificial World," on the other hand, refers to the case of one or more users being able to tour a virtual computer-generated environment (e.g., a distant planet, fantasy world, etc.) from the user's location. The computer-generated environment is this uniquely rendered for each user, and the users are each able to see and hear the real-world location from a unique perspective.

Service Architecture for Leveraging the HNSS Container

In addition to the industry-felt needs described above, further desire has been expressed to enable the HNSS container and scene graph description as candidate technologies to provide media support for full 6 DoF MR services and light field displays across the Milgram scale. The following embodiments therefore provide an innovative candidate service architecture that leverages the HNSS container to provide a series of flexible architectural components, which may be chained together for 6 DoF services and support of light field displays.

Figure 11:
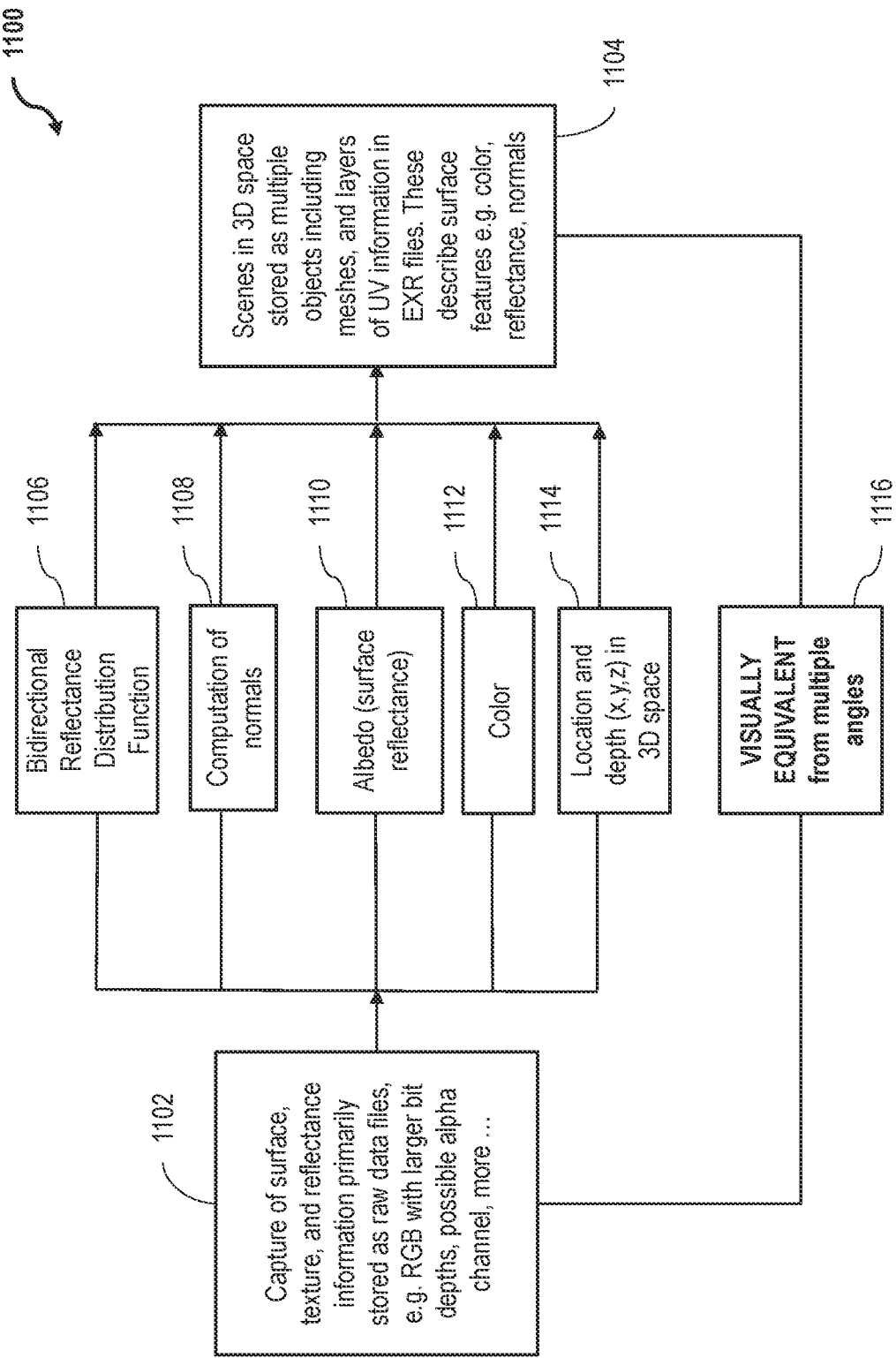
FIG. 11 depicts a workflow for transforming raster data into geometric data, in accordance with an embodiment.

FIG. 11 depicts a workflow 1100 for transforming raster data into geometric data. That is, in an exemplary embodiment, workflow 1100 depicts an overview of a transformation process from raw raster natural-world content 1102 into its geometric format data 1104. Natural-world content 1102 may, for example, include the capture of surface, texture, and reflectance information. This captured information may be stored as raw data files (e.g., RGB with larger bit depths, alpha channels, etc.), including, for example, EXR format data. Geometric format data 1104 may include points and 3D space, stored as multiple objects, including texture meshes, layers of UV mapping information (e.g., also in EXR files). The meshes and layers may describe surface features of respective stored objects, including color, reflectance, normals, etc., and be capable of processing as CGI material.

In exemplary of operation workflow 1100, transformation from natural-world content 1102 into geometric format data 1104 is performed using one or more photogrammetric techniques to identify the depth of pixels in the scene, as well as the material properties and reflectance properties for the same objects in the scene. Such photogrammetric techniques include one or more of a bidirectional reflectance distribution function 1106, computation of normals processing 1108, Albedo (e.g., surface reflectance) processing 1110, color processing 1112, and location and/or depth processing 1114 (e.g., in 3D, that is, x-y-z space). An example of such multiple processing techniques on a single scene is demonstrated by rendering 1000, FIG. 10, which illustrates a real-world capture of a person as content that is scanned through multiple passes (e.g., if passes 1002, 1004) to create the resulting geometry.

In the exemplary embodiment, workflow 1100 additionally includes visual equivalence processing 1116, which may be performed, for example, for multiple angles. Additional photogrammetric processes compute additional properties of the person's face (e.g., bidirectional reflectance functions, surface normals, illumination characteristics, and albedo) which, when layered together, produce the final CGI-format result that constitutes rendering 1000. Exemplary architectures utilizing the HNSS container for these transformation techniques are described below with respect to FIGS. 12-19.

Figure 12:
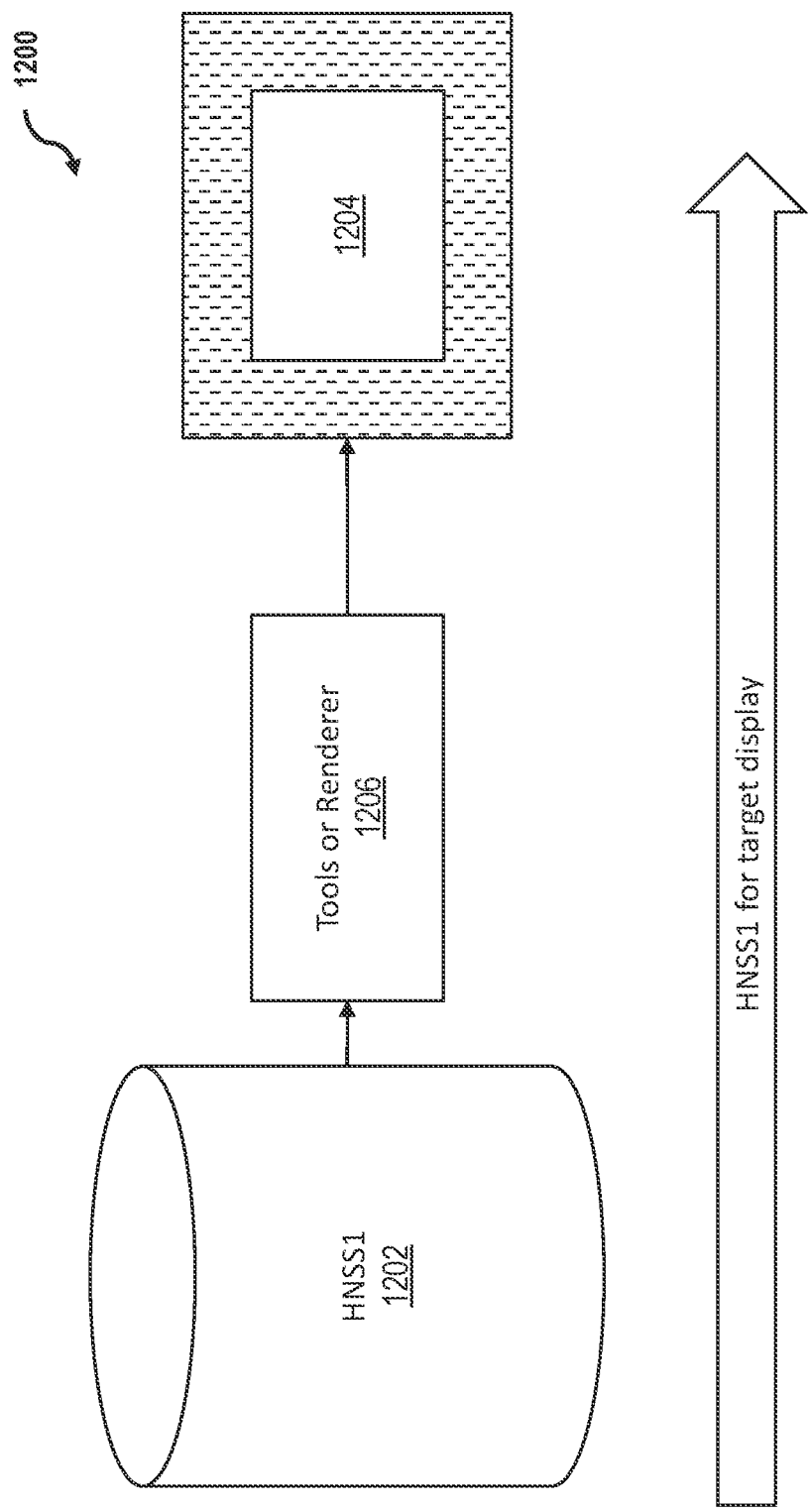
FIG. 12 is a schematic illustration of a network-based media processing subsystem capable of adjusting content in an input MIF to the requirements for a specific target display, in accordance with an embodiment.

FIG. 12 is a schematic illustration of a network-based media processing subsystem 1200 capable of adjusting content in an input MIF to the requirements for a specific target display. Subsystem 1200 includes an HNSS container 1202 for a target display 1204. HNSS 1202 is in operable communication with a rendering unit 1206, and rendering unit 1206 is in operable communication with target display 1204. In an exemplary embodiment, rendering unit 1206 includes one or more of the tools, functions, or techniques described above, and rendering by unit 1206 is performed over a network, that is, by one or more of the NBMP techniques described above.

Figure 13:
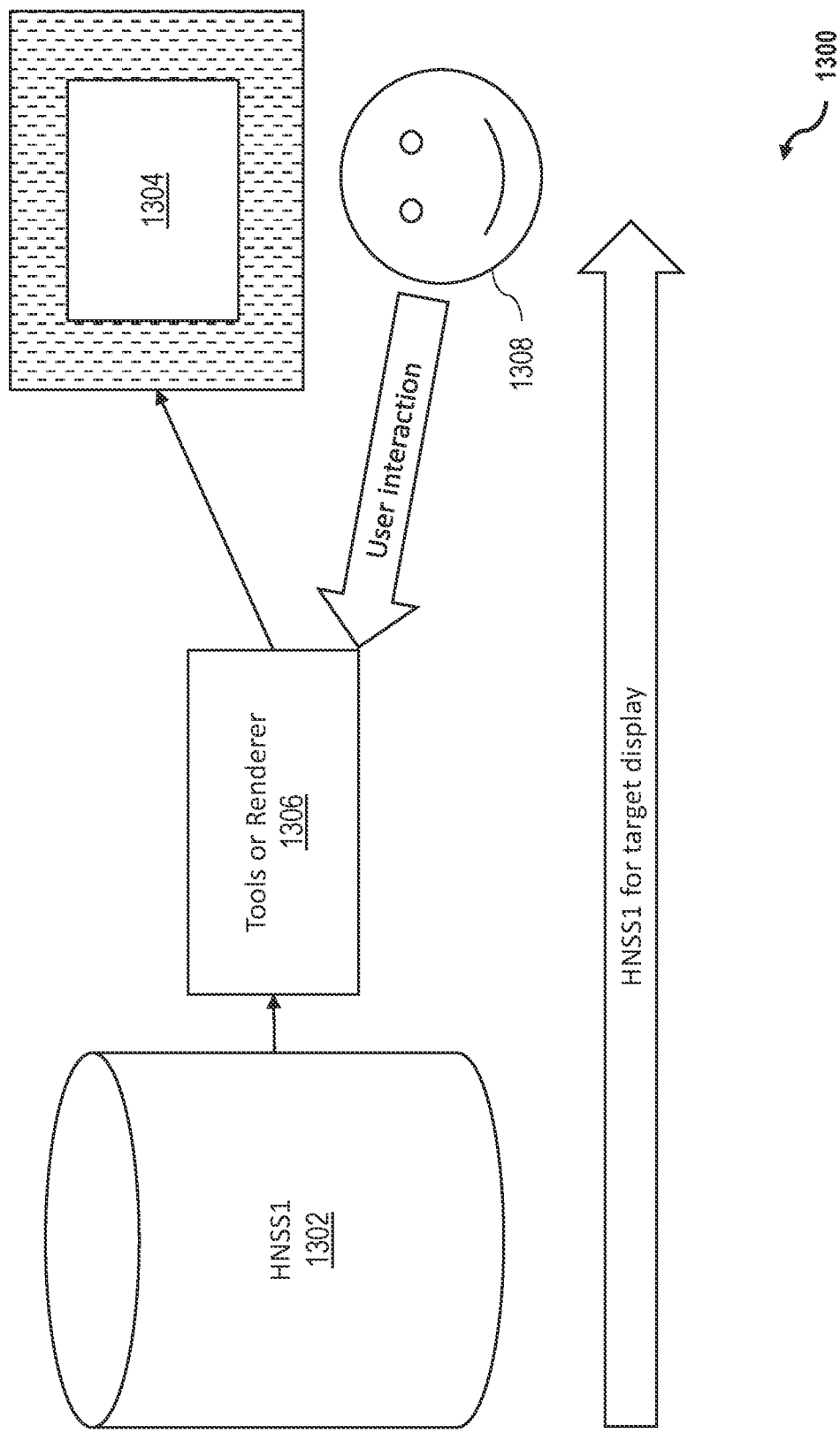
FIG. 13 is a schematic illustration of a network-based media processing subsystem capable of supporting user interaction, in accordance with an embodiment.

FIG. 13 is a schematic illustration of a network-based media processing subsystem 1300 capable of supporting user interaction. Subsystem 1300 is similar to subsystem 1200, FIG. 12, and includes an HNSS container 1302 for a target display 1304, with a rendering unit 1306 disposed functionally therebetween. Different from subsystem 1200 though, subsystem 1300 depicts an embodiment in which user interaction may be performed by a user device 1308. In an exemplary embodiment, user device 1308 interacts with rendering unit 1306, and rendering by unit 1306 may be performed over a network using, for example, NBMP techniques.

Figure 14A:
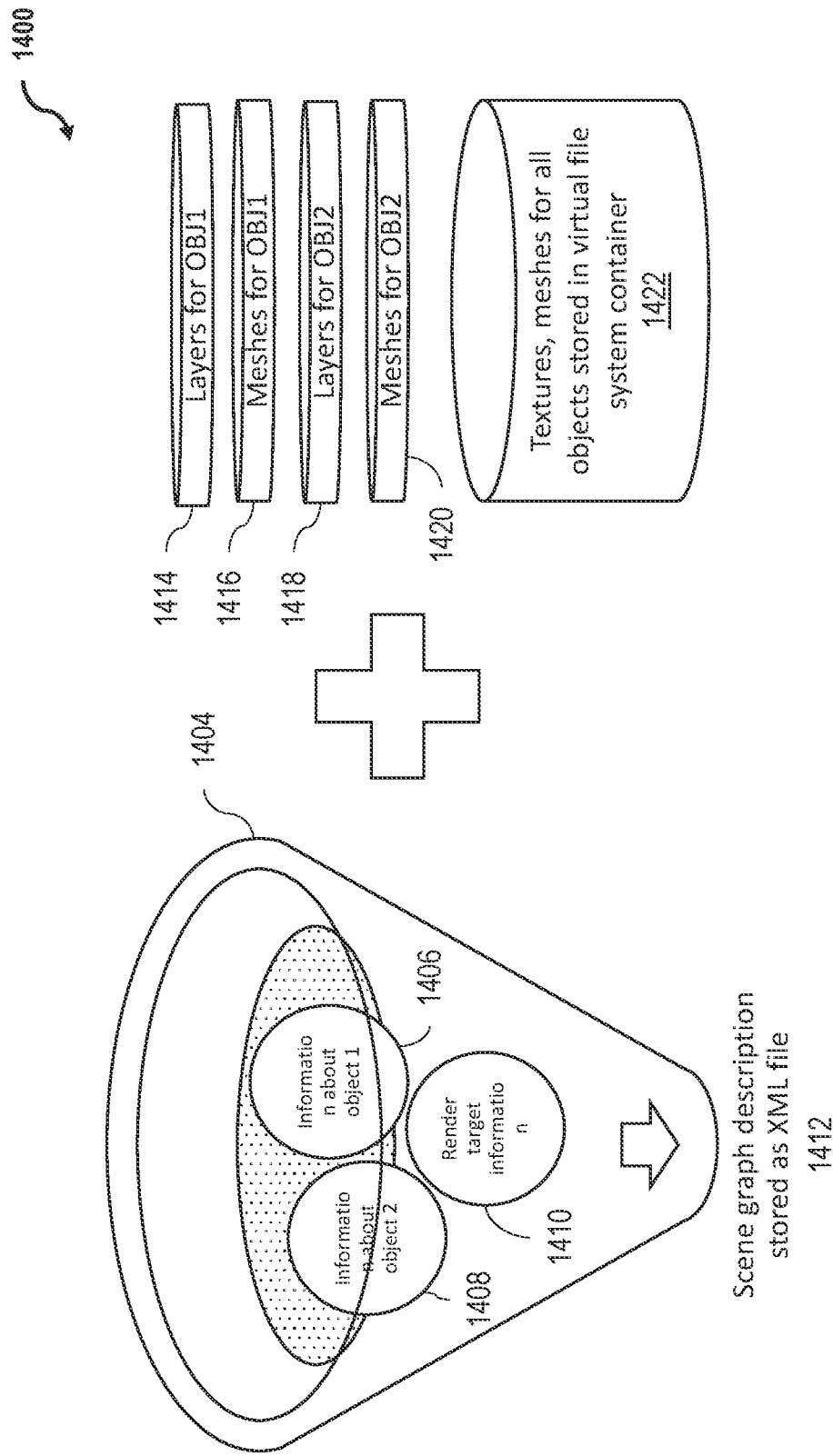
FIG. 14A illustrates an architecture for a non-hybrid natural/synthetic scene, in accordance with an embodiment.
Figure 14B:
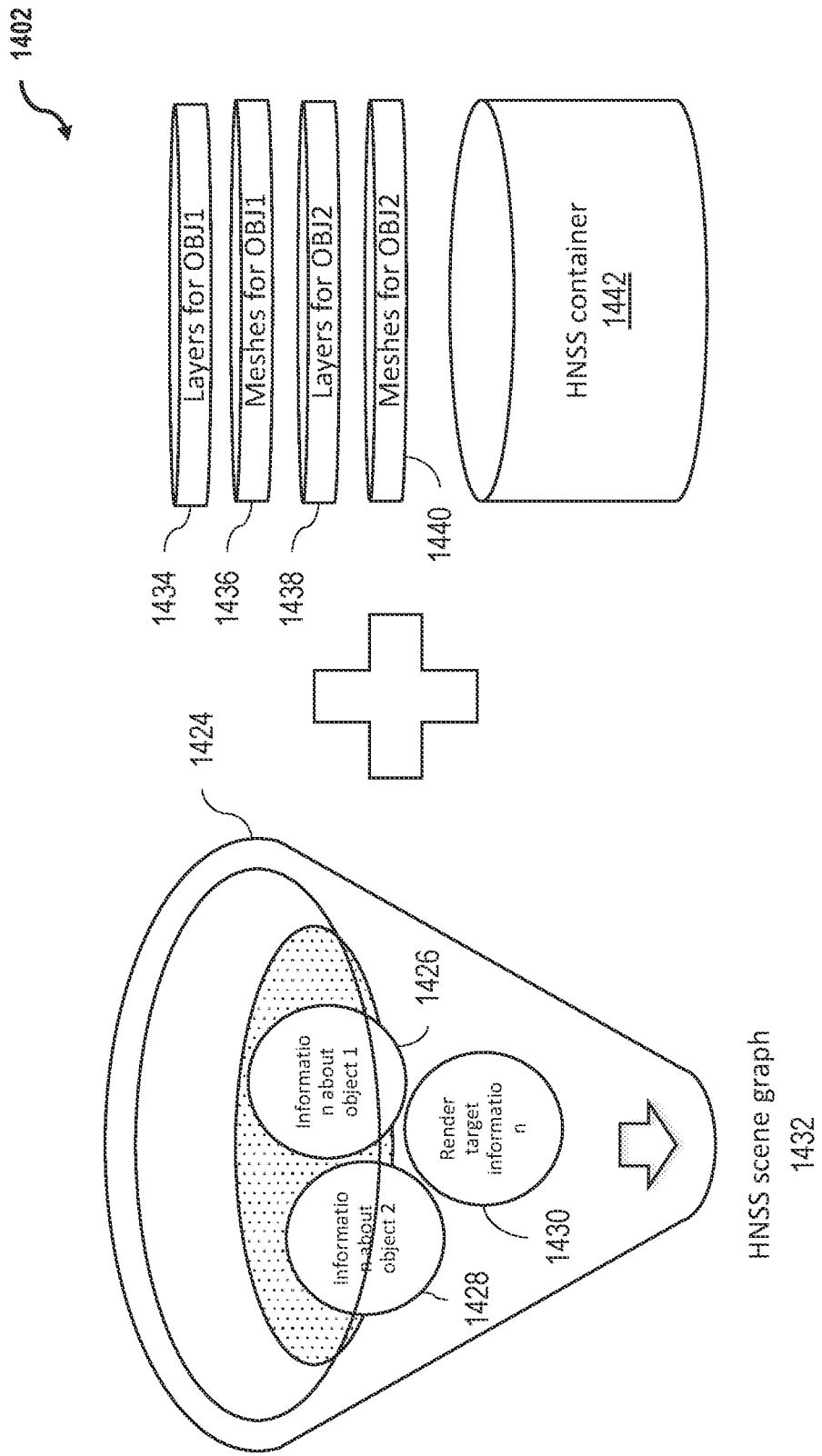
FIG. 14B illustrates an architecture for a hybrid natural/synthetic scene, in accordance with an embodiment.

FIG. 14A illustrates a non-HNSS scene 1400. FIG. 14B illustrates an HNSS scene 1402. As depicted in FIG. 14A, scene 1400 implements an architecture 1404 configured to filter content of scene 1400, which includes, for example, first object information 1406 (e.g., a first object in scene 1400), second object information 1408 (e.g., a second object in scene 1400), and rendering target information 1410. Informations 1406, 1408, 1410 are collectively merged to create a scene graph description 1412, which may, for example, be stored as an XML file. Scene 1400 further includes first object layers 1414, first object meshes 1416, second object layers 1418, and second object meshes 1420. In the exemplary embodiment, layers 1414, 1418, and meshes 1416, 1420 are stored within a virtual file system container 1422, together with scene graph description 1412. In this example, "non-HNSS" refers to non-hybrid data such as all-CGI or all natural. In the example illustrated in FIG. 14A, scene 1400 may be considered to be a synthetic representation. In accordance with the MIF of the present embodiments herein, the MIF is thus further able to support legacy 2D video.

Referring to FIG. 14B, HNSS scene 1402 implements an architecture 1424 configured to filter content of scene 1402, which includes, for example, first object information 1426 (e.g., a first object in scene 1402), second object information 1428 (e.g., a second object in scene 1402), and rendering target information 1430. Informations 1426, 1428, 1430 are collectively merged to create in HNSS scene graph 1432. Scene 1402 further includes first object layers 1434, first object meshes 1436, second object layers 1438, and second object meshes 1440. In the exemplary embodiment, layers 1434, 1438, and meshes 1436, 1440 are stored within in HNSS container 1442, together with HNSS scene graph 1432. HNSS container 1442 may, for example, be similar to HNSS container 1202, FIG. 12, or HNSS container 1302, FIG. 13.

In the exemplary embodiments depicted in FIGS. 14A-B, the funnel shapes for architectures 1404, 1424 are illustrated, by way of analogy and not in a limiting sense, to depict how data may be filtered (e.g., at the illustrated top, wide opening of funnel shape) and then merged into a whole (e.g., at the bottom, narrower opening of funnel shape). In an embodiment, the respective containers 1422, 1442 may include an ORBX virtual file system container, and scene graphs 1412, 1432 may represent an ORBX scene graph. In the case where the container/scene graph is ORBX-based, it should be noted that the organization of the ORBX scene graph is a tree-like structure stored in an XML file, and each node in the logical tree describes an object or a collection of attributes that may be applied to the objects (e.g., a placement node). Edges in the logical tree structure may be regarded as relationships, where some such relationships themselves form input parameter relationships (i.e., nodes that are serialized together to form another node), or an output target node.

Using the flexible service components described above, a flexible service architecture for 6 DoF may be created through a series of such components chained together. In some embodiments, one or more components are executed remotely, that is, over a network (e.g., by NBMP). In at least one embodiment, one or more chained components are executed concurrently (i.e., combined into a single processing step). Through this flexible service architecture innovation, the network is better enabled to facilitate service for 6

DoF applications and light field displays (i.e., dependent on the available capabilities of the network, including its number of server nodes, the type of wireline or wireless network connection, speed of the connection, simplex/duplex properties of connection, latency characteristics, etc.), as well as the number of users/devices in each service group. This flexible service architecture concept is therefore applicable to deployment in Software Defined Networks (SDN), and/or spin-up/take-down/instantiation with respect to Network Function Virtualization (NFV). Moreover, the flexible architectures described herein further facilitate deployment using optimal combinations of hardware and software components as various workflow process elements.

Figure 15:
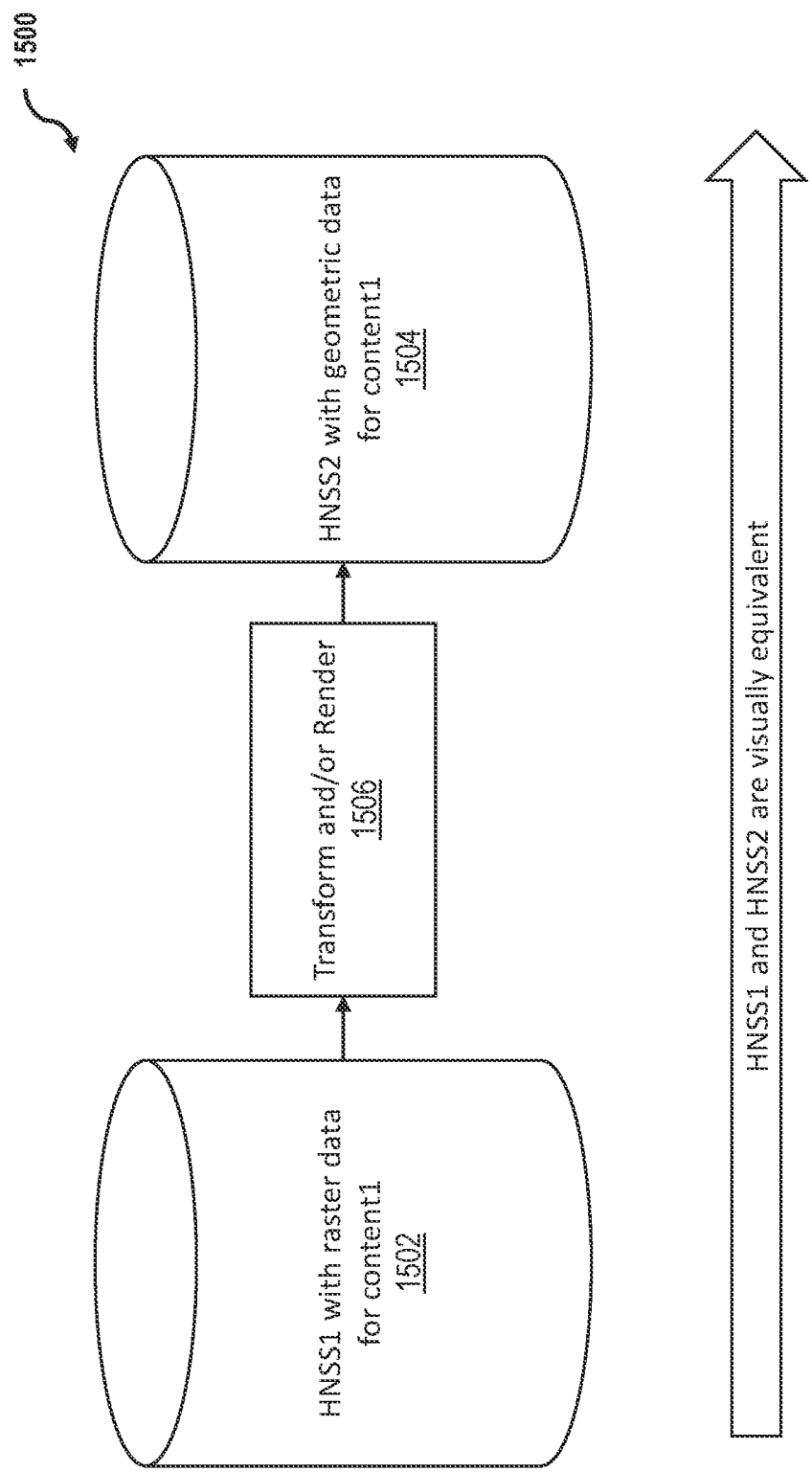
FIG. 15 is a schematic illustration of a visual equivalence subsystem, in accordance with an embodiment.

FIG. 15 is a schematic illustration of a visual equivalence subsystem 1500. Subsystem 1500 includes a first HNSS container 1502 and a second HNSS container 1504, with a transformation/rendering unit 1506 functionally disposed therebetween. First HNSS container 1502 contains raster data for media content (e.g., raster information 1102, FIG. 11), and second HNSS container 1504 contains the geometric data (e.g., geometric format data 1104, FIG. 11) for the same media content. In an exemplary embodiment, subsystem 1500 is configured to execute at least one visually equivalent workflow processing step (e.g., visual equivalence processing 1116, FIG. 11) to transform the raster data into the geometric data. In some embodiments, the visually equivalent processing step is executed remotely over a network. In other embodiments, the processing step is completed entirely using local resources. Upon completion of the processing step, the content within second HNSS.

Figure 16:
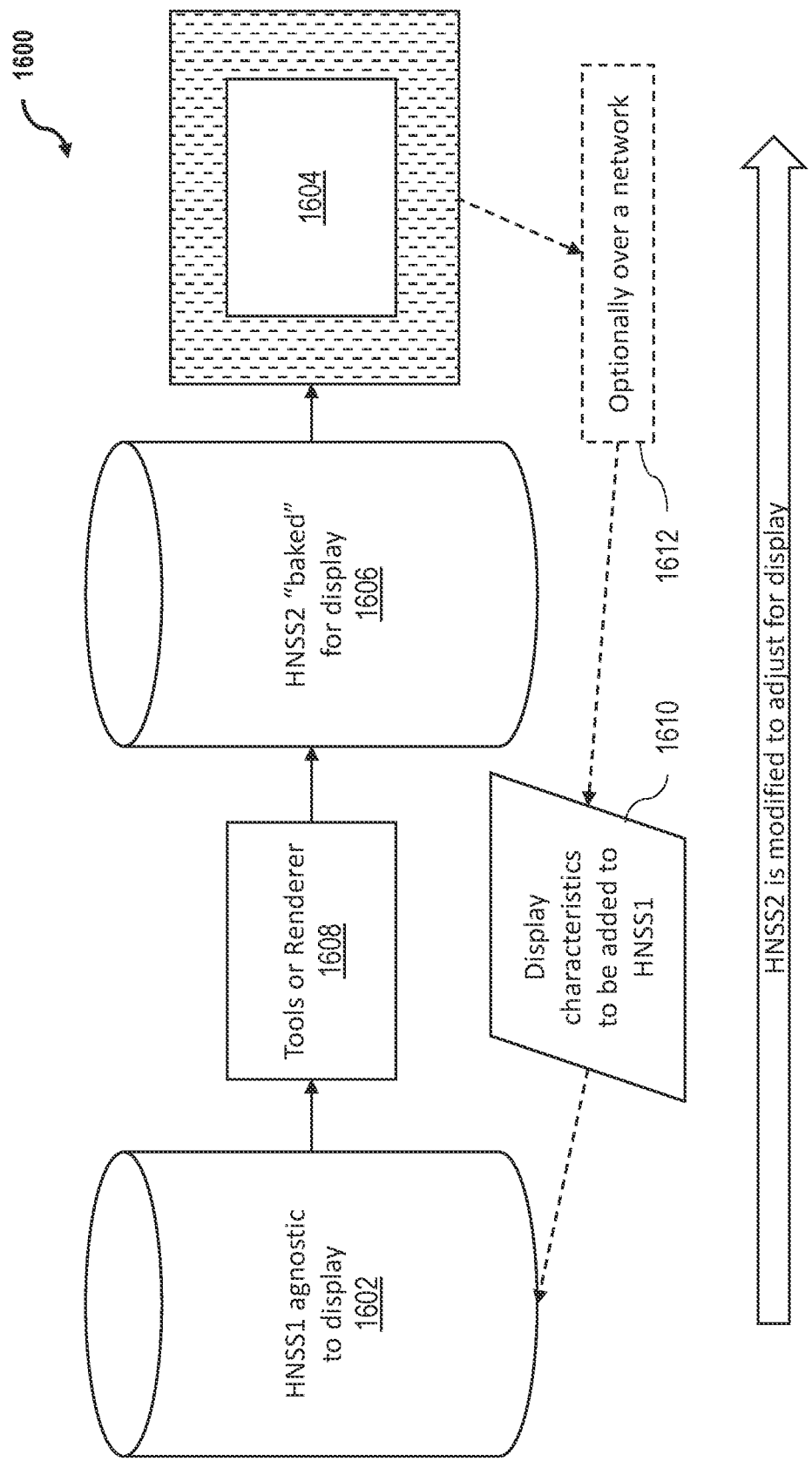
FIG. 16 is a schematic illustration of a display adjustment subsystem, in accordance with an embodiment.

FIG. 16 is a schematic illustration of a display adjustment subsystem 1600. Subsystem 1600 is similar to subsystem 1200, FIG. 12, and includes a first HNSS container 1602 for a target display 1604. Different from subsystem 1200 though, subsystem 1600 includes a second HNSS container 1606 and a rendering unit 1608, with rendering unit 1608 functionally disposed between the first HNSS container 1602 and second HNSS container 1606, and with the second HNSS container 1606 functionally disposed between the rendering unit 1608 and target display 1604. In the exemplary embodiment, first HNSS container 1602 is agnostic to target display 1604, and second HNSS container 1606 is "baked" (i.e., raw data after it has been processed for further use) for target display 1604.

In an exemplary embodiment, subsystem 1600 is configured to prepare the media content for display on target display 1604, second HNSS container 1604 may be modified to adjust the corresponding data for the particular characteristics of display 1604, and rendering by unit 1608 may be performed over a network (e.g., using NBMP techniques). In the exemplary embodiment, subsystem 1600 is further configured to add display characteristics 1610, collected as feedback 1612, from the terminal display device of target display 1604 (e.g., over the network), such that rendering unit 1608 is enabled to adjust the media content for display characteristics 1610. For example, target display 1604 may support a certain EOTF or targeted OOTF for HDR and thus rendering unit 1608 is enabled, in this case, to perform the correct transformation to accommodate the display characteristics. In some cases, target display signal for might be a legacy 2D display, and the media content might then be in a geometric or vectorized format, in which case, rendering unit 1608 would be configured to convert the media content to 2D content suitable for target display 1604.

Figure 17:
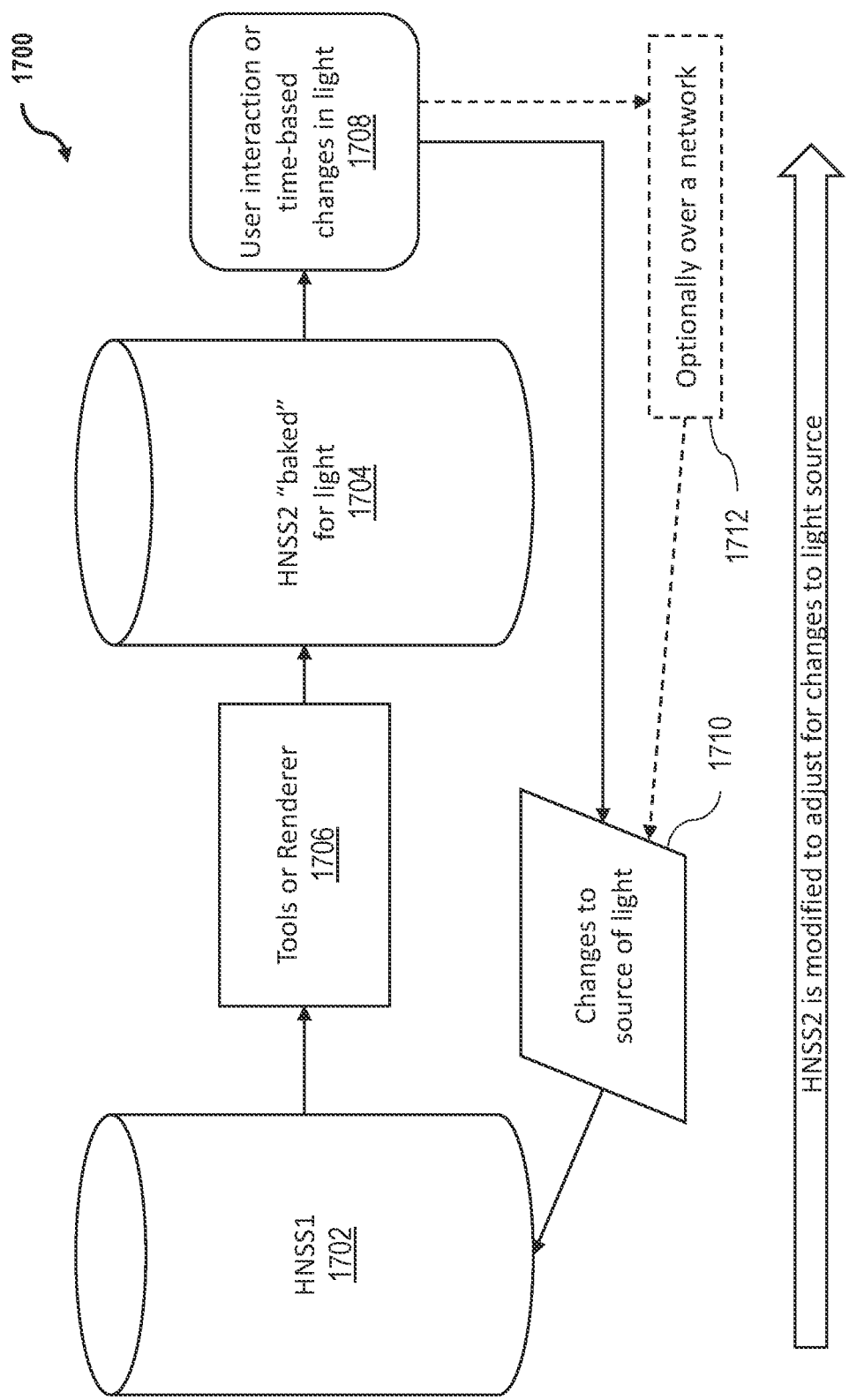
FIG. 17 is a schematic illustration of a prebaking subsystem, in accordance with an embodiment.

FIG. 17 is a schematic illustration of a prebaking subsystem 1700. Subsystem 1700 is similar to subsystem 1600, FIG. 16, and includes a first HNSS container 1702, a second HNSS container 1704, and a rendering unit 1706 functionally disposed therebetween (e.g., over a network). Different from subsystem 1600, subsystem 1700 is configured to enable modifications to second HNSS container 1704 to adjust for changes to a light source, including the direction of that light. In this example, these modifications are referred to as "prebaking" (described further below with respect to FIG. 18). In the exemplary processing step represented by subsystem 1700, second HNSS 1704 is in operable communication with an interactive source 1708 (e.g., a user device or a clock) indicating a change to the lighting of a particular scene. That is, source 1708 may interactively indicate that time has elapsed, or a user has initiated an event that indicates a change two the lighting in the scene. Light change information 1710 is therefore fed back to first HNSS container 1702, such that rendering unit 1706 may apply such acquired information 1710 to bake some or all parts of the scene with the updated lighting. In some embodiments, light change information 1710 is automatically fed to first HNSS container 1702 (e.g., where source 1708 is a clock or timer). In other embodiments, light source information 1710 is received by first HNSS container 1702 as network feedback 1712 (e.g., where source 1708 is a user operating over the network).

Figure 18:
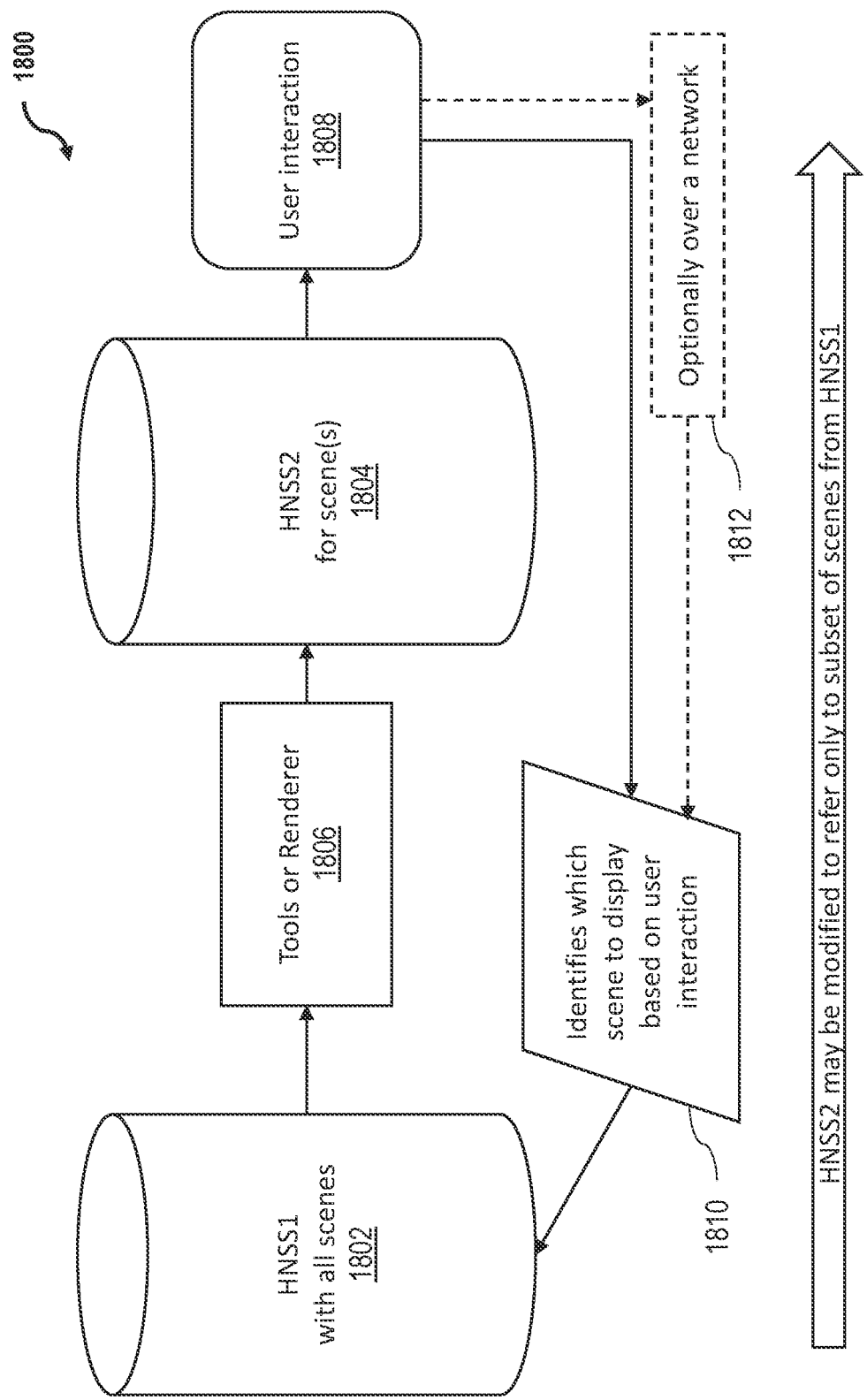
FIG. 18 is a schematic illustration of a navigation scheme for the prebaking subsystem depicted in FIG. 17.

FIG. 18 is a schematic illustration of a navigation scheme 1800 for prebaking subsystem 1700, FIG. 17. That is, in the exemplary embodiment, navigation scheme 1800 includes components similar to those of subsystem 1700, such as a first HNSS container 1802, a second HNSS container 1804, and a rendering unit 1806 functionally disposed therebetween (e.g., over a network). Subsystem 1800 further includes an interactive user source 1808, from which identification information 1810 they be collected, and which identifies the particular scene to display based on interaction with the user source 1808. In the exemplary embodiment, navigation scheme 1800 is configured to enable navigation into new volume areas.

More particularly, in the example depicted in FIG. 18, second HNSS container 1804 may be modified to refer only to a subset (i.e., fewer) of all scenes from first HNSS container 1802. Identification information 1810 thus represents to first HNSS container 1802 which, of the contained "all scenes" contained are to be displayed, and of thus contained, within the second HNSS container 1804. Identification information 1810 may be received automatically, or as feedback 1812 over the network, in may be based on an event caused by interaction with user source 1808 that results in a significant change to the visual content such as, for example, a case of user source 1808 entering a new room in a museum (i.e., carried by a user, whether in the real-world or virtually). In some cases, the event may be based on other time-based triggers.

According to the foregoing embodiments, a flexible network architecture is capable of leveraging essentially any number of renderers, with or without access to a network, in a series or chain of renderers. The present systems and methods realize further advantages in that each renderer is then capable of being deployed to service a particular type of request (e.g., change in lighting, or change in scene, such as a user navigating from one room to another). Additionally, one or all of the respective renderers may be advantageously deployed to modify particular media contents to be suitable for a particular display. That is, each such renderer is enabled to take, as an input, an HNSS scene graph and corresponding media assets physically located in the respective HNSS container. In some cases, such media assets are compressed.

FIG. 19 depicts a workflow 1900 for 6 DoF content ecosystem. In an exemplary embodiment, workflow 1900 includes an image acquisition 1902, a depth estimation 1904, editing and post processing 1906, and an output 1908. Image acquisition 1902 may represent an actual image capturing process (e.g., using a light field camera), or the acquisition of image raster information. Depth estimation 1904 represents a transformation process of raster information into geometric data (e.g., workflow 1100, FIG. 11). Editing and post processing 1906 may include one or more digital content creation tools. For example, at present, at least 28 known digital content creation tools support ORBX. Output 1908 may, for example, represent storage of 6 DoF real-world light field content in synthetic formats, and subsequent display on a target display device. In an exemplary embodiment, the exemplary ORBX components and processes described above may be implemented throughout workflow 1900 (e.g., from camera to display).

In one or more of the embodiments described above, the relevant network architecture for 6 DoF and light field applications may include one or more individual or collective components configured to be capable of (i) ingesting raw HNSS content, (ii) converting the HNSS content to a format consistent for eventual display, (iii) prebaking the content for lighting and/or geometry, and (iv) scene navigation.

Additionally, the several renderers/rendering units described above may be considered, for purposes of this application, to include engineered programs that are based on a selective mixture of technology disciplines, including without limitation, light physics, visual perception, mathematics, and software development. One or more of the several renderers may be configured to perform rendering in a slow and methodical process (e.g., pre-rendering), or alternatively in real-time. In an exemplary embodiment, one or more of the renderers described above is capable of (i) using an input HNSS or objects/information to create a new HNSS, (ii) outputting another HNSS, (iii) outputting RGB/light information to drive a display, (iv) responding to user input, and/or (v) tying objects to a game. Such objects may include one or more of: EXR for textures, such as floating point/large integer bit depths, and deep images including multiple channels beyond color; VDB for point clouds; alembic for meshes; other raw formats; compressed video; compressed audio; animation; procedural scripts; and game scripts.

Additionally, the several attributes and metadata types described above may include, without limitation, camera position, direction for source of light, resolution of image, rendering instructions, placement instructions, logical relationships, support for various textures, support for various surface reflections, and scattering of objects (e.g., for grass hair, etc.). The foregoing systems and methods are therefore advantageously capable of realizing network architectures that may flexibly combine any or all of the network components described above in the design of end-to-end workflows. The flexible network architectures are capable of supporting multiple displays, including displays utilizing 6 DoF services, and LF displays.

Exemplary embodiments of systems and methods for network-based media processing are described above in detail. The systems and methods of this disclosure though, are not limited to only the specific embodiments described herein, but rather, the components and/or steps of their implementation may be utilized independently and separately from other components and/or steps described herein.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A network-based media processing (NBMP) system, comprising:
   a media control plane implementing a first network protocol, and including a media origin server (MOS);
   a network control plane implementing a second network protocol, and including a network platform orchestrator (NPO), a first network orchestration client (NOC), a network resource element (NRE), and a plurality of media processing elements (MPEs), wherein the NPO is configured for operable communication with (i) the MOS through the media control plane, (ii) the first NRE through the network control plane, and (iii) a first client device through the network control plane;
   a media data plane implementing a third network protocol, and including a first media resource within the NRE;
   a mixed content media interchange format (MIF) configured to provide a unified data format for (i) receiving input mixed reality media content having a mixture of both natural content and synthetic content, and (ii) outputting hybrid natural/synthetic scene (HNSS) content according to a target format requested from the first client device and a second client device different than the first client device; and
   a first hybrid natural/synthetic scene (HNSS) container configured to transform raw raster natural content into geometric format data,
   wherein the first network protocol is different from the second network protocol,
   wherein the NRE is configured to deliver the mixed content media to the first client device and the second client device in at least one of an augmented reality format and an augmented virtuality format,
   wherein the raw raster natural content includes data capture of at least one of surface, texture, and reflectance information of a scene, and wherein the geometric format data includes at least one of (i) points in three dimensional space, (ii) texture meshes, and (iii) layers of mapping information, and wherein the second client device does not include sufficient processing power and memory to process the mixed content media.

2. The NBMP system of claim 1, wherein the NPO is further configured for operable communication with a second NOC integral to the first client device.

3. The NBMP system of claim 2, wherein the second NOC is configured for operable communication with a second media resource integral to the first client device.

4. The NBMP system of claim 3, wherein the MOS is configured for operable communication with the second media resource through a first MPE of the plurality of MPEs.

5. The NBMP system of 1, wherein the MOS is configured for operable communication with a first display unit integral to the first client device and a second display unit integral to the second client device.

6. The NBMP system of 1, wherein the NRE is configured for operable communication with (i) the first display unit of the first client device through a second MPE of the plurality of MPEs, and (ii) the second display unit of the second client device through a third MPE of the plurality of MPEs.

7. A network-based media processing (NBMP) system, comprising:

a media control plane implementing a first network protocol, and including a media origin server (MOS);

a network control plane implementing a second network protocol, and including a network platform orchestrator (NPO), a first network orchestration client (NOC), a network resource element (NRE), and a plurality of media processing elements (MPEs), wherein the NPO is configured for operable communication with (i) the MOS through the media control plane, (ii) the first NRE through the network control plane, and (iii) a first client device through the network control plane;

a media data plane implementing a third network protocol, and including a first media resource within the NRE;

a mixed content media interchange format (MIF) configured to provide a unified data format for delivering mixed content media having both natural content and synthetic content, according to a format requested from the first client device and a second client device different than the first client device; and a first hybrid natural/synthetic scene (HNSS) container configured to transform raw raster natural content into geometric format data, wherein the first network protocol is different from the second network protocol, wherein the NRE is configured for operable communication with (i) the first display unit of the first client device through a second 1MPE of the plurality of MPEs, and (ii) the second display unit of the second client device through a third MPE of the plurality of MPEs, wherein the first client device includes sufficient user resources to process the mixed content media, wherein the second client device does not include sufficient user resources to process the mixed content media, and wherein the mixed content MIF is further configured to format the mixed content media to enable the NRE to deliver the mixed content media (i) to the first client device according to a first resource capability of the first display unit, and (ii) to the second client device according to a second resource capability of the second display unit, wherein the NRE is further configured to deliver the mixed content media to the first display unit and the second display unit in at least one of an augmented reality format and an augmented virtuality format, and wherein the raw raster natural content includes data capture of at least one of surface, texture, and reflectance information of a scene, and wherein the geometric format data includes at least one of (i) points in three dimensional space, (ii) texture meshes, and (iii) layers of mapping information.

8. The NBMP system of 7, wherein the NRE is further configured to serve as a central processor for the first display unit and the second display unit.

9. The NBMP system of 8, wherein the synthetic content of the mixed content media includes at least one of computer-generated assets, point clouds, light-field assets, and six degree-of-freedom video data.

10. The NBMP system of 8, wherein the natural content of the mixed content media includes at least one of 360-degree video data, two-dimensional video data, and three degree-of-freedom video data.

11. The NBMP system of 7, further comprising a rendering unit configured to enable communication between the first HNSS container and at least one of the first display unit and the second display unit.

12. The NBMP system of 11, wherein the rendering unit includes one or more tool modules to implement the mixed content MIF according to the respective first resource capability of the first display unit and the second resource capability of the second display unit.

13. The NBMP system of 12, wherein the rendering unit is configured to enable user interaction by a respective user of the first display unit and the second display unit.

14. The NBMP system of 13, further comprising a second HNSS container disposed between the rendering unit and at least one of the first display unit and the second display unit.

15. The NBMP system of 14, wherein the first HNSS container is agnostic to the at least one of the first display unit and the second display unit, and wherein the second HNSS container is configured to interact with the at least one of the first display unit and the second display unit based on the respective first resource capability and the second resource capability.

16. The NBMP system of 14, wherein the first HNSS container is configured to store raster data of the mixed content media, and wherein the second HNSS container is configured to store geometric data of the mixed content media.

17. A network-based media processor configured for operable communication with a content provider, a remote first client device, and a remote second client device different from the remote first client device, the network-based media processor comprising:

a hybrid natural/synthetic scene (HNSS) container configured to transform raw raster natural content from the content provider into geometric format data; and a mixed content media interchange format (MIF) configured to provide a unified data format for (i) receiving input mixed reality media content having a mixture of both natural content and synthetic content, and (ii) outputting HNSS content to the remote first client device according to a first target format corresponding to first user resources of the remote first client device, and (iii) outputting the HNSS content to the remote second client device according to a second target format corresponding to second user resources of the remote second client device, wherein the network-based media processor is configured to deliver the mixed reality content media to the remote first client device and to the remote second client device in at least one of an augmented reality format and an augmented virtuality format, wherein the raw raster natural content includes data capture of at least one of surface, texture, and reflectance information of a scene, and wherein the geometric format data includes at least one of (i) points in three dimensional space, (ii) texture meshes, and (iii) layers of mapping information, wherein the first user resources are greater than second the user resources, and wherein the second user resources are insufficient to independently process the mixed reality content media apart from the second target format.

* * * * *